US009523900B2

(12) United States Patent
Morinaga et al.

(10) Patent No.: US 9,523,900 B2
(45) Date of Patent: Dec. 20, 2016

(54) LIQUID CRYSTAL DISPLAY DEVICE

(71) Applicant: Sharp Kabushiki Kaisha, Osaka-shi, Osaka (JP)

(72) Inventors: Junichi Morinaga, Osaka (JP); Kuniko Maeno, Osaka (JP); Masayuki Yamanaka, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 64 days.

(21) Appl. No.: 14/415,189

(22) PCT Filed: Jul. 17, 2013

(86) PCT No.: PCT/JP2013/069428
§ 371 (c)(1),
(2) Date: Jan. 16, 2015

(87) PCT Pub. No.: WO2014/014032
PCT Pub. Date: Jan. 23, 2014

(65) Prior Publication Data
US 2015/0192834 A1    Jul. 9, 2015

(30) Foreign Application Priority Data

Jul. 19, 2012 (JP) .................................. 2012-160825

(51) Int. Cl.
*G02F 1/1362*  (2006.01)
*G02F 1/1343*  (2006.01)
*G02F 1/1335*  (2006.01)
*G02F 1/1339*  (2006.01)
*G02F 1/1368*  (2006.01)
*G02F 1/1333*  (2006.01)
*G02F 1/1337*  (2006.01)

(52) U.S. Cl.
CPC ....... *G02F 1/136286* (2013.01); *G02F 1/1337* (2013.01); *G02F 1/1368* (2013.01);
(Continued)

(58) Field of Classification Search
CPC .................. G02F 1/136286; G02F 1/136213; G02F 1/13394; G02F 1/1368; G02F 1/136227; G02F 1/134309; G02F 1/134336; G02F 1/133514; G02F 2201/40; G02F 2201/52; G02F 1/133345
See application file for complete search history.

(56) References Cited

U.S. PATENT DOCUMENTS 6,275,274 B1 * 8/2001 Kanemori ............. G02F 1/1368
349/109
6,661,488 B1  12/2003 Takeda et al.
(Continued)

FOREIGN PATENT DOCUMENTS

JP  11-242225 A     9/1999
JP  2003-043525 A   2/2003
(Continued)

*Primary Examiner* — Paul Lee
*Assistant Examiner* — Jia Phan
(74) *Attorney, Agent, or Firm* — Keating & Bennett, LLP

(57) ABSTRACT

A liquid crystal display device includes a first substrate, a second substrate, a liquid crystal layer, and a columnar spacer. The first substrate includes a pixel electrode, a TFT, and an interlayer insulating layer. The second substrate includes first, second and third color filters arranged in a delta arrangement. Each pixel has a substantially polygonal shape with n vertices (where n is an integer and n≥8) or a substantially circular shape. The TFT and the columnar spacer are arranged in a first tricolor boundary region. A contact hole cut through the interlayer insulating layer is arranged in a second tricolor boundary region. Two of three pixels that define the first tricolor boundary region also define the second tricolor boundary region, but the remaining pixel is arranged at a different location.

15 Claims, 16 Drawing Sheets

(52) U.S. Cl.
CPC .... *G02F 1/13394* (2013.01); *G02F 1/133345* (2013.01); *G02F 1/133512* (2013.01); *G02F 1/133514* (2013.01); *G02F 1/133784* (2013.01); *G02F 1/134336* (2013.01); *G02F 1/136213* (2013.01); *G02F 1/136227* (2013.01); *G02F 2201/40* (2013.01); *G02F 2201/52* (2013.01)

(56) References Cited

U.S. PATENT DOCUMENTS

| | | | |
|---|---|---|---|
| 7,394,513 B2 * | 7/2008 | Andou | G02F 1/133514 349/145 |
| 2002/0036740 A1 | 3/2002 | Kubo et al. | |
| 2004/0021808 A1 * | 2/2004 | Johgan | G02F 1/13394 349/106 |
| 2005/0052605 A1 * | 3/2005 | Okumura | G02F 1/1393 349/146 |
| 2005/0099378 A1 * | 5/2005 | Kim | G02F 1/134309 345/99 |
| 2006/0274090 A1 * | 12/2006 | Koyama | G09G 3/3258 345/695 |
| 2007/0070093 A1 * | 3/2007 | Lin | G02F 1/134336 345/694 |
| 2008/0094530 A1 * | 4/2008 | Ina | G02F 1/1345 349/39 |

FOREIGN PATENT DOCUMENTS

| | | |
|---|---|---|
| JP | 2005-062629 A | 3/2005 |
| JP | 2006-227338 A | 8/2006 |
| JP | 2006-309182 A | 11/2006 |
| JP | 2007-219556 A | 8/2007 |

* cited by examiner

FIG.11
(a) 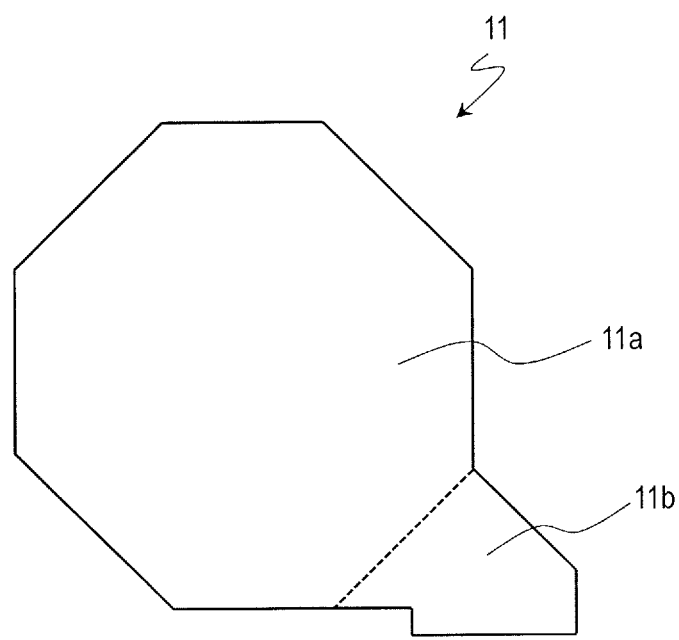
(b) 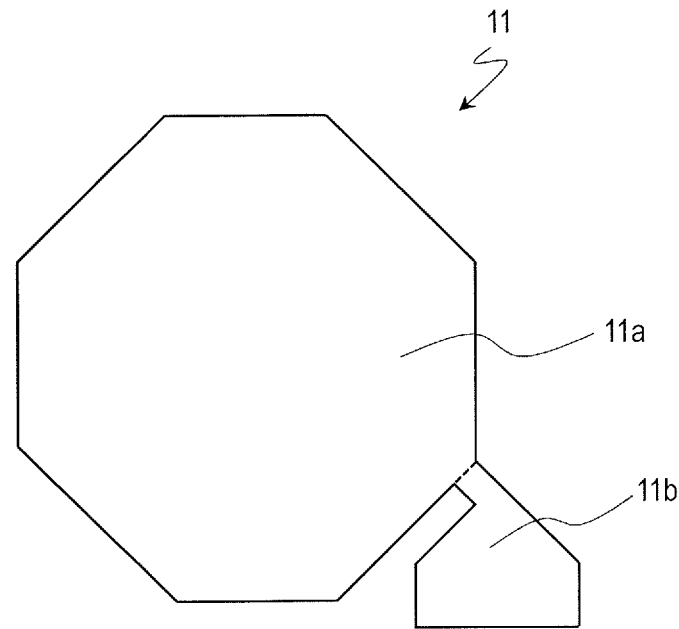

LIQUID CRYSTAL DISPLAY DEVICE

TECHNICAL FIELD

The present invention relates to a liquid crystal display device, and more particularly relates to a liquid crystal display device including color filters with a delta arrangement.

BACKGROUND ART

Liquid crystal display devices have a significantly reduced depth and will dissipate much less power than other kinds of display devices. By taking advantage of these features, liquid crystal display devices have recently been used extensively in various kinds of information devices including laptop personal computers, cellphones, and electronic organizers and videotape recorders with a built camera and an LCD monitor.

Each of those various kinds of display devices represents colors by adding together the colors red, green and blue that are the three primary colors of light. A liquid crystal display device generally includes an illumination unit which emits white light (i.e., a backlight), and color filters which selectively transmit red, green and blue light rays (i.e., red, green and blue color filters) are respectively arranged to face red, green and blue pixels of a liquid crystal display panel.

A "striped arrangement" is currently adopted most extensively as the arrangement of those color filters. According to the striped arrangement, red, green and blue color filters are arranged in stripes so as to run vertically (i.e., longitudinally) on the display screen. When the striped arrangement is adopted, each pixel usually has a rectangular shape with an aspect ratio of three to one so that a single color display pixel has a square shape.

Meanwhile, a so-called "delta arrangement" is also known. According to the delta arrangement, red, green and blue color filters are arranged so that a triangle is formed if their centers are connected together with a line. The delta arrangement can be used effectively to display a natural image, and therefore, is mainly adopted in the viewfinders of camcorders and digital cameras. When the delta arrangement is adopted, each pixel normally has a square shape.

Furthermore, to improve the viewing angle characteristic of liquid crystal display devices, an alignment division type vertical alignment (VA) mode has also been proposed recently. The VA mode is a display mode in which liquid crystal molecules are aligned substantially perpendicularly to the surface of the substrate when no voltage is applied thereto. In this description, the "alignment division" means dividing a single pixel into multiple regions in which liquid crystal molecules get aligned in mutually different orientations upon the application of a voltage.

Examples of the alignment division type vertical alignment modes include the MVA (Multi-domain Vertical Alignment) mode disclosed in Patent Document No. 1 and the CPA (Continuous Pinwheel Alignment) mode disclosed in Patent Document No. 2.

According to the MVA mode, the alignment division is done by alignment control structures which are provided for both of two substrates that face each other with a liquid crystal layer interposed between them. As the alignment control structures, slits cut through electrodes and/or ribs provided on electrodes may be used. Under the alignment controlling force exerted by these alignment control structures, typically four liquid crystal domains are formed within a single pixel upon the application of a voltage.

According to the CPA mode, the alignment division is done by an oblique electric field generated at an edge portion of a pixel electrode and an oblique electric field generated at a notch and/or hole which has been cut through the pixel electrode. Upon the application of a voltage, liquid crystal molecules are aligned radially (i.e., axisymmetrically). That is to say, a single pixel is divided into multiple regions in which liquid crystal molecules are aligned in mutually different orientations.

CITATION LIST

Patent Literature

Patent Document No. 1: Japanese Laid-Open Patent Publication No. 11-242225
Patent Document No. 2: Japanese Laid-Open Patent Publication No. 2003-43525

SUMMARY OF INVENTION

Technical Problem

Recently, as liquid crystal display devices has come to have even higher definition, the aperture ratio (i.e., the ratio of a portion of a display area that actually contributes to getting a display operation done to the overall display area) tends to further decrease to cause increasingly serious problems. The present inventors discovered and confirmed via experiments that as for a VA mode (e.g., CPA mode) liquid crystal display device including color filters with a delta arrangement, among other things, it was particularly difficult to achieve good enough display quality while keeping the aperture ratio sufficiently high, as will be described in detail later.

The present inventors perfected our invention to overcome these problems by achieving good enough display quality and increasing the aperture ratio at the same time in a liquid crystal display device including color filters with a delta arrangement.

Solution to Problem

A liquid crystal display device according to an embodiment of the present invention includes: a first substrate; a second substrate which faces the first substrate; a liquid crystal layer which is interposed between the first and second substrates; and a columnar spacer which defines the thickness of the liquid crystal layer. The device has a plurality of color display pixels which are arranged in columns and rows to form a matrix pattern. Each of the plurality of color display pixels is defined by a plurality of pixels, which are first, second and third pixels that represent mutually different colors. The first substrate includes a pixel electrode which is provided for an associated one of the pixels, a thin-film transistor which is electrically connected to the pixel electrode, and an interlayer insulating layer which covers the thin-film transistor. The second substrate includes a counter electrode which faces the pixel electrode, first, second and third color filters which transmit light rays in mutually different colors, and an opaque layer. The thin-film transistor includes a gate electrode, a source electrode, and a drain electrode. The interlayer insulating layer has a contact hole to connect the pixel electrode electrically to the drain electrode of the thin-film transistor. The first, second and third color filters are arranged in a delta arrangement. Each of the plurality of pixels has a substantially polygonal shape with n vertices (where n is an integer which is equal to or greater than eight) or a substantially circular shape. The thin-film transistor and the columnar spacer which are associated with each of the plurality of pixels are arranged in a first tricolor boundary region which is defined between the first, second and third pixels. The contact hole associated with each of the plurality of pixels is arranged in a second tricolor boundary region which is also defined between the first, second and third pixels but which is different from the first tricolor boundary region. If attention is paid to the first and second tricolor boundary regions associated with an arbitrary one of the plurality of pixels, two of the first, second and third pixels that define the first tricolor boundary region are the same as two of the first, second and third pixels that define the second tricolor boundary region, but the other of the first, second and third pixels that define the first tricolor boundary region is arranged at a different location from the other of the first, second and third pixels that define the second tricolor boundary region.

In one embodiment, the liquid crystal display device with the configuration described above includes a liquid crystal capacitor which is formed by the pixel electrode, the counter electrode and the liquid crystal layer and a storage capacitor which is electrically connected in parallel to the liquid crystal capacitor. The storage capacitor is arranged in the second tricolor boundary region.

In one embodiment, a line which connects together respective approximate centers of the first and second tricolor boundary regions that are associated with an arbitrary one of the plurality of pixels is tilted with respect to row and column directions.

In one embodiment, the first substrate includes a scan line which runs in the row direction and which is electrically connected to the thin-film transistor's gate electrode and a signal line which is electrically connected to the thin-film transistor's source electrode.

In one embodiment, when viewed along a normal to its display screen, both of the scan line and signal line overlap at least partially with the pixel electrode.

In one embodiment, the first substrate includes: a storage capacitor electrode which is electrically connected to the pixel electrode; a storage capacitor counter electrode which faces the storage capacitor electrode; a storage capacitor line which is electrically connected to the storage capacitor counter electrode; and a projection portion which is extended in the column direction from the storage capacitor counter electrode. And a portion of the signal line and the projection portion are arranged in a bicolor boundary region which is defined between the first and second pixels that are adjacent to each other in the row direction, or between the second and third pixels that are adjacent to each other in the row direction, or between the third and first pixels that are adjacent to each other in the row direction.

In one embodiment, each of the plurality of pixels has a substantially regular octagonal shape.

In one embodiment, the pixel electrode has a portion in the substantially regular octagonal shape.

In one embodiment, the opaque layer has holes in the substantially regular octagonal shape which are respectively associated with the plurality of pixels, and each of the first, second and third color filters has a substantially hexagonal shape.

In one embodiment, each of the plurality of pixels has a substantially perfectly circular shape.

In one embodiment, a plurality of thin-film transistors are connected to the signal line. One of the plurality of thin-film transistors that are connected to the signal line and another one of the thin-film transistors which is adjacent to the former thin-film transistor have structures which are symmetric to each other with respect to an axis that is a line drawn parallel to the column direction.

In one embodiment, the liquid crystal layer is a vertical alignment liquid crystal layer.

In one embodiment, the liquid crystal layer is a horizontal alignment liquid crystal layer, the first substrate has an alignment film which is provided to face the liquid crystal layer, the alignment film has been subjected to a rubbing treatment, the alignment film has been rubbed from the second tricolor boundary region toward the respective centers of its associated pixels, and the pixel electrode has a shape in which none of its edges are located in a boundary between the second tricolor boundary region and its associated pixels.

In one embodiment, the liquid crystal display device with the configuration described above includes a liquid crystal capacitor which is formed by the pixel electrode, the counter electrode and the liquid crystal layer and a storage capacitor which is electrically connected in parallel to the liquid crystal capacitor. The first substrate includes a transparent electrode which overlaps with the pixel electrode with a dielectric layer interposed between them. And the storage capacitor is formed by the pixel electrode, the transparent electrode and the dielectric layer interposed between the pixel electrode and the transparent electrode.

In one embodiment, the first substrate includes a connection line which is extended from the drain electrode of the thin-film transistor that is arranged in the first tricolor boundary region toward the contact hole that is arranged in the second tricolor boundary region, and the connection line has a portion which runs straight in a direction that is tilted with respect to the row direction.

Advantageous Effects of Invention

According to an embodiment of the present invent ion, a liquid crystal display device including color filters with a delta arrangement can achieve good enough display quality and can increase the aperture ratio at the same time.

BRIEF DESCRIPTION OF DRAWINGS

FIG. 11 (a) illustrates the pixel electrode 11 of the liquid crystal display device 200, and (b) illustrates the pixel electrode 11 of the liquid crystal display device 100.

DESCRIPTION OF EMBODIMENTS

Embodiments of the present invention will now be described with reference to the accompanying drawings. It should be noted that the present invention is in no way limited to the embodiments to be described below.

Embodiment 1

Figure 1:
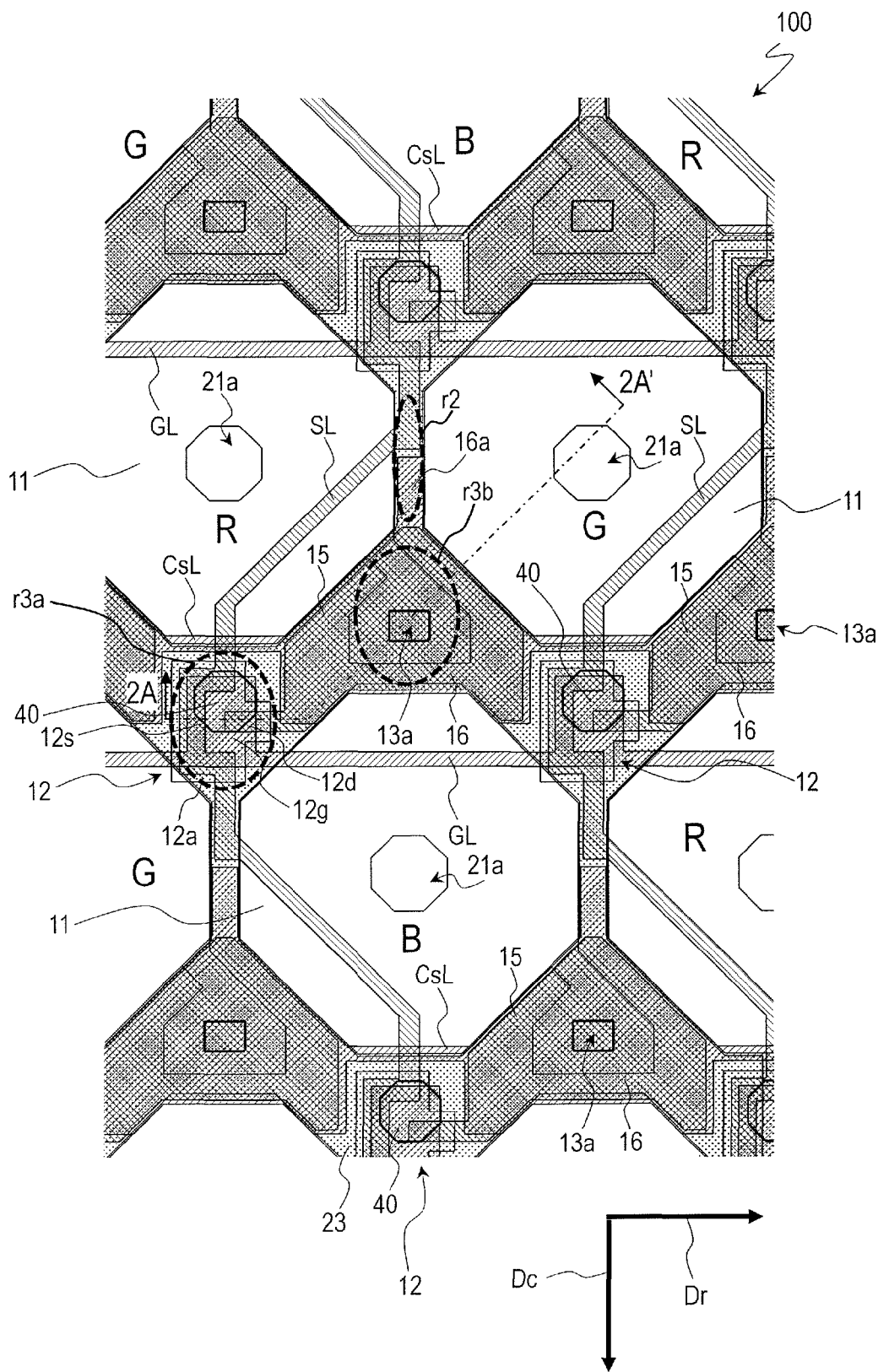
FIG. 1 A plan view schematically illustrating a liquid crystal display device 100 according to an embodiment of the present invention.
Figure 2:
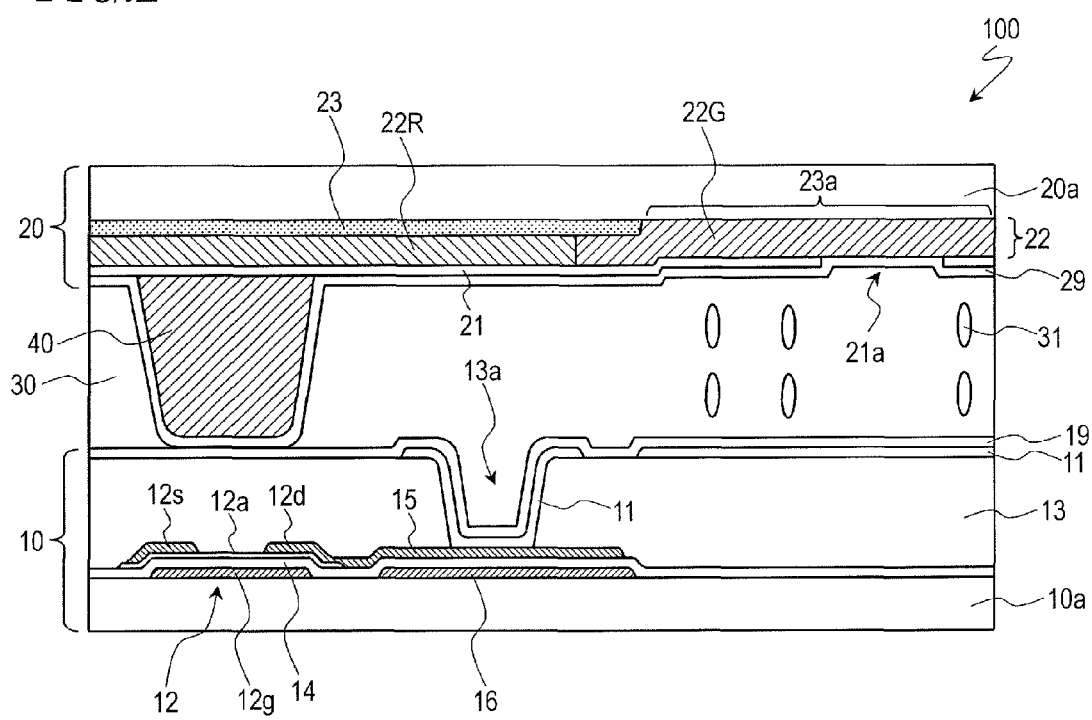
FIG. 2 A cross-sectional view schematically illustrating the liquid crystal display device 100 as viewed on the plane 2A-2A' shown in FIG. 1.

A liquid crystal display device 100 as a first embodiment will be described with reference to FIGS. 1 and 2. FIG. 1 is a plan view schematically illustrating the liquid crystal display device 100, and FIG. 2 is a cross-sectional view as viewed on the plane 2A-2A' shown in FIG. 1. This liquid crystal display device 100 conducts a display operation in the CPA mode. Also, in this liquid crystal display device 100, color filters are arranged in the delta arrangement.

As shown in FIG. 2, this liquid crystal display device 100 includes an active-matrix substrate (which will be hereinafter referred to as a "TFT substrate") 10, a counter substrate (which will be sometimes hereinafter referred to as a "color filter substrate") 20 which faces the TFT substrate 10, and a liquid crystal layer 30 which is interposed between the TFT substrate 10 and the counter substrate 20. The liquid crystal display device 100 further includes a columnar spacer 40 which defines the thickness of the liquid crystal layer 30.

The liquid crystal display device 100 further has a plurality of color display pixels which are arranged in columns and rows to form a matrix pattern. In FIG. 1, a row direction Dr and a column direction Dc are shown. The color display pixel is the minimum unit of color display. Each of those color display pixels is defined by a plurality of pixels. In this embodiment, the plurality of pixels that define a single color display pixel are three pixels (which will be hereinafter referred to as first, second and third pixels) representing mutually different colors. Specifically, those three pixels are red, green and blue pixels R, G and B representing the colors red, green and blue, respectively.

As described above, in a general liquid crystal display device including color filters with the delta arrangement, pixels have a square shape. On the other hand, in the liquid crystal display device 100 of this embodiment, each of the plurality of pixels (i.e., red, green and blue pixels R, G and B) has a substantially regular octagonal shape. That is to say, the outer periphery of an area which contributes as a display unit in each primary color to a display operation has a substantially regular octagonal shape. It should be noted that the shape of the pixels is defined by an opaque member provided for the TFT substrate 10 and/or an opaque member provided for the counter substrate 20 (e.g., the opaque layer 23 to be described later).

Figure 3:
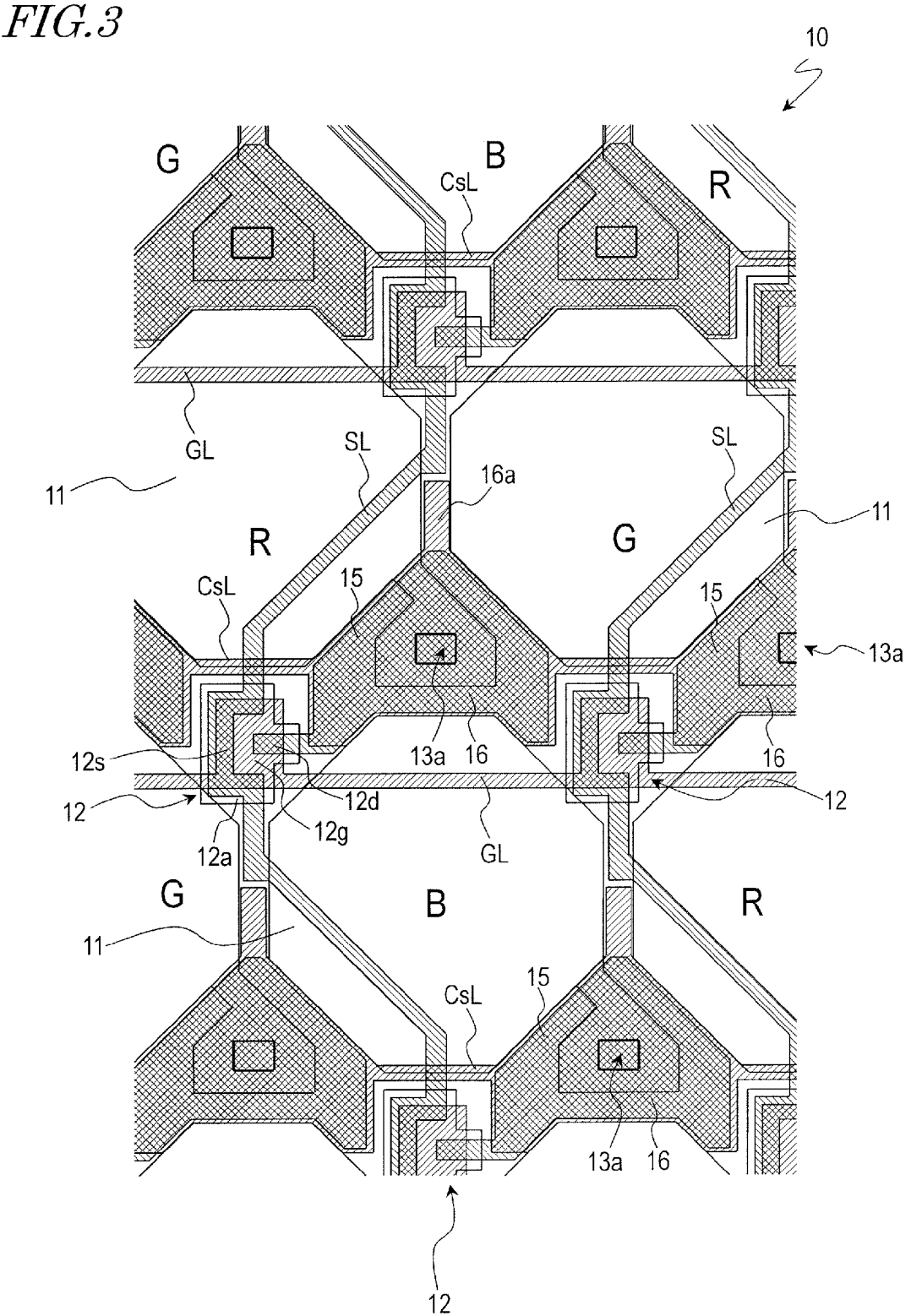
FIG. 3 A plan view schematically illustrating the configuration of a TFT substrate 10 that the liquid crystal display device 100 includes.
Figure 4:
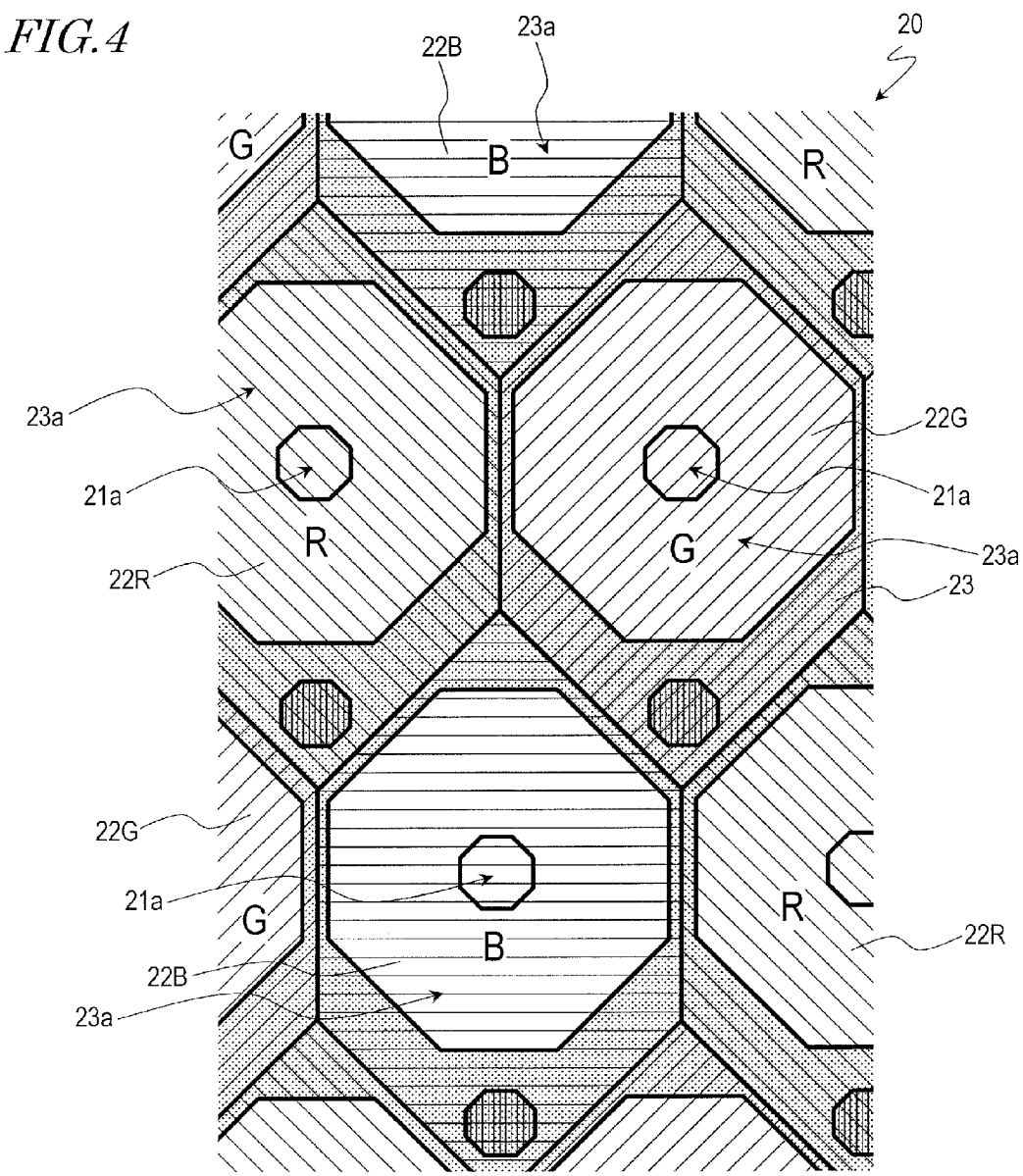
FIG. 4 A plan view schematically illustrating the configuration of a counter substrate 20 that the liquid crystal display device 100 includes.

Next, the configuration of the liquid crystal display device 100 will be described in further detail with reference to FIGS. 3 and 4, too. FIG. 3 is a plan view schematically illustrating the configuration of the TFT substrate 10. FIG. 4 is a plan view schematically illustrating the configuration of the counter substrate 20. The area shown in FIGS. 3 and 4 is the same as the area shown in FIG. 1.

As shown in FIGS. 1, 2 and 3, the TFT substrate 10 includes a pixel electrode 11, a thin-film transistor (TFT) 12 and an interlayer insulating layer 13.

The pixel electrodes 11 is provided for an associated one of the pixels. The pixel electrode 11 may be made of a transparent conductive material (such as ITO or IZO). The pixel electrode 11 includes a portion in the substantially regular octagonal shape (which will be hereinafter referred to as an "octagonal portion") and a portion extended from the octagonal portion to a contact hole 13a to be described later (which will be hereinafter referred to as a "connecting portion").

The TFT 12 is connected to the pixel electrode 11. The TFT 12 is comprised of a gate electrode 12g, a source electrode 12s, a drain electrode 12d, a semiconductor layer 12a and a gate insulating layer 14. Although the TFT 12 is supposed to be a bottom gate type in this embodiment, the TFT 12 does not have to be a bottom gate type.

The interlayer insulating layer 13 is provided so as to cover the TFTs 12. The interlayer insulating layer 13 has a contact hole 13a to electrically connect the pixel electrode 11 to the drain electrode 12d of the TFT 12. The interlayer insulating layer 13 may be made of a photosensitive resin, for example.

The TFT substrate 10 also includes a scan line GL and a signal line SL, and further includes a storage capacitor electrode 15, a storage capacitor counter electrode 16 and a storage capacitor line CsL. These lines and electrodes are typically made of a metallic material.

The scan line GL runs in the row direction Dr, is electrically connected to the gate electrode 12g of the TFT 12 and supplies a scan signal to the TFT 12. In this embodiment, the gate electrode 12g of the TFT 12 is extended as a branch from the scan line GL.

The signal line SL is electrically connected to the source electrode 12s of the TFT 12, and supplies a display signal to the TFT 12. The signal line SL does not simply run straight in the column direction Dc but includes portions which run in directions that tilt with respect to the column direction Dc. In this embodiment, a portion of the signal line SL (i.e., a portion overlapping with the TFT 12) functions as a source electrode 12s.

As shown in FIGS. 1 and 3, when viewed along a normal to the display screen, a portion of the scan line GL and a portion of the signal line SL overlap with the pixel electrodes 11 with the gate insulating layer 14 and/or the interlayer insulating layer 13 interposed between them.

The storage capacitor electrode 15 is electrically connected to the pixel electrode 11. In this embodiment, the storage capacitor electrode 15 is extended from the drain electrode 12d of the TFT 12 and is connected to the pixel electrode 11 inside the contact hole 13a of the interlayer insulating layer 13, thereby electrically connecting the pixel electrode 11 and the drain electrode 12d of the TFT 12 together.

The storage capacitor counter electrode 16 is arranged to face the storage capacitor electrode 15. In this embodiment, a projection portion 16a is extended in the column direction from the storage capacitor counter electrode 16.

The storage capacitor line CsL is electrically connected to the storage capacitor counter electrode 16, and supplies a storage capacitor counter voltage (which will be hereinafter referred to as "Cs voltage") to the storage capacitor counter electrode 16. In this embodiment, the storage capacitor counter electrode 16 is extended from the storage capacitor line CsL. In other words, a portion of the storage capacitor line CsL has its width broadened so as to face the storage capacitor electrode 15, and functions as the storage capacitor counter electrode 16.

These members of the TFT substrate 10 are stacked one upon the other on a transparent substrate 10a with an electrically insulating property (such as a glass substrate). Specifically, the scan lines GL, gate electrodes 12g, storage capacitor lines CsL and storage capacitor counter electrodes 16 are arranged on the surface of the transparent substrate 10a to face the liquid crystal layer 30, and the gate insulating layer 14 is arranged to cover these lines and electrodes.

An islanded semiconductor layer 12a is arranged on portions of the gate insulating layer 14 which overlap with the gate electrode 12g. In addition, on the gate insulating layer 14, also arranged are the signal lines SL, source electrodes 12s, drain electrodes 12d and storage capacitor electrodes 15.

The interlayer insulating layer 13 has been formed to cover the signal lines SL and the TFTs 12. And on the interlayer insulating layer 13, the pixel electrodes 11 are arranged.

A liquid crystal capacitor is formed by the pixel electrode 11, a counter electrode 21 (to be described later), and the liquid crystal layer 30 interposed between them. Also, a storage capacitor is formed by the storage capacitor electrode 15, the storage capacitor counter electrode 16 and the gate insulating layer 14 interposed between them. The storage capacitor is electrically connected in parallel to the liquid crystal capacitor.

As shown in FIGS. 1, 2 and 4, the counter substrate 20 includes the counter electrode 21, a color filter layer 22 and an opaque layer (black matrix) 23.

The counter electrode 21 is arranged to face the pixel electrode 11. Typically, the counter electrode 21 is a single conductive film which is used in common by every pixel in the display area. In this embodiment, the counter electrode 21 has a hole 21a which has been cut to face approximately the center of the pixel electrode 11.

The color filter layer 22 includes three kinds of color filters (which will be hereinafter referred to as "first, second and third color filters", respectively) which transmit light rays in mutually different colors. Specifically, the color filter layer 22 includes red color filters 22R which transmit a color red ray, green color filters 22G which transmit a color green ray, and blue color filters 22B which transmit a color blue ray.

Each of these red, green and blue color filters 22R, 22G and 22B has a substantially hexagonal shape as shown in FIG. 4. In this embodiment, the red, green and blue color filters 22R, 22G and 22B are arranged in a delta arrangement as can be seen from FIG. 4. Thus, a number of pixels are arranged in the display area so that two adjacent rows of pixels shift from each other by a half pitch as shown in FIG. 1.

The opaque layer 23 has holes 23a which are arranged to face the respective pixels. These holes 23a have a substantially regular octagonal shape. In the following description, the rest of the opaque layer 23 other than the holes 23a will be sometimes hereinafter referred to as an "opaque portion".

These members of the counter substrate 20 are stacked one upon the other on a transparent substrate 20a with electrically insulating property (such as a glass substrate). Specifically, the opaque layer 23, the color filter layer 22 and the counter electrode 21 are stacked one upon the other in this order on the surface of the transparent substrate 20a so as to face the liquid crystal layer 30.

The liquid crystal layer 30 interposed between the TFT substrate 10 and the counter substrate 20 described above is a vertical alignment liquid crystal layer. The liquid crystal layer 30 includes liquid crystal molecules 31 with negative dielectric anisotropy. A pair of alignment films 19 and 29 is provided on the surface of the TFT substrate 10 and counter substrate 20 to face the liquid crystal layer 30. These alignment films 19 and 29 are vertical alignment films.

The columnar spacer 40 plays the role of defining the thickness of the liquid crystal layer 30 (i.e., the cell gap), and may be made of a photosensitive resin, for example. In this embodiment, the columnar spacer 40 is arranged on the counter electrode 21 of the counter substrate 20, and the alignment film 29 on the counter substrate 20 covers not only the surface of the counter electrode 21 but also the surface of the columnar spacer 40 as well.

Figure 5:
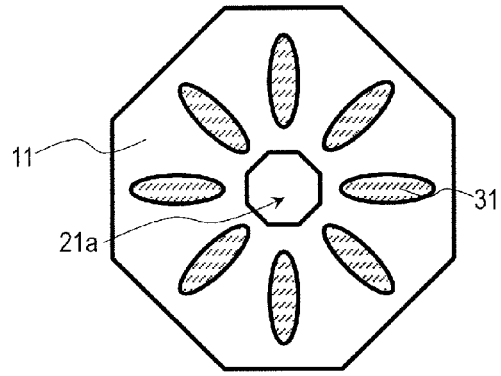
FIG. 5 A plan view schematically illustrating the alignment state of liquid crystal molecules 31 when a voltage is applied thereto.

When no voltage is applied to the liquid crystal layer 30, the liquid crystal molecules 31 in the liquid crystal layer 30 are aligned substantially perpendicularly to the respective surfaces of the TFT substrate 10 and counter substrate 20. On the other hand, when a voltage is applied to the liquid crystal layer 30, the liquid crystal molecules 30 get aligned axisymmetrically (i.e., radially) around the hole 21a of the counter electrode 21 as shown in FIG. 5. This is because under the alignment controlling force of an oblique electric field generated in the vicinity of an edge (outer edge) of the pixel electrode 11, the liquid crystal molecules 31 get tilted substantially perpendicularly to the edge of the pixel electrode 11. Inside the hole 21a of the counter electrode 21, the axisymmetric alignment is stabilized by the oblique electric field generated there upon the application of a voltage.

As can be seen, by inducing axisymmetric alignments of the liquid crystal molecules 31 upon the application of a voltage, the azimuth angle dependence of the viewing angle characteristic can be reduced. Optionally, the hole 21a of the counter electrode 21 may be replaced with a projection made of a dielectric material (such as a photosensitive resin).

As described above, the liquid crystal display device 100 of this embodiment adopts a delta arrangement as the arrangement of red, green and blue color filters 22R, 22G and 22B. That is why there are "tricolor boundary regions" as regions to be defined between the red, green and blue pixels R, G and B. Specifically, there are two kinds of tricolor boundary regions r3a and r3b (which are naturally located at mutually different positions and will be hereinafter referred to as a "first tricolor boundary region" and a "second tricolor boundary region", respectively) as shown in FIG. 1.

In the first tricolor boundary region r3a, arranged are a TFT 12 and a columnar spacer 40 which are associated with any of the multiple pixels. In the second tricolor boundary region r3b, on the other hand, arranged are a contact hole 13a and a storage capacitor which are associated with any of the multiple pixels. The storage capacitor is configured to include the storage capacitor electrode 15 and the storage capacitor counter electrode 16 as described above.

Figure 6:
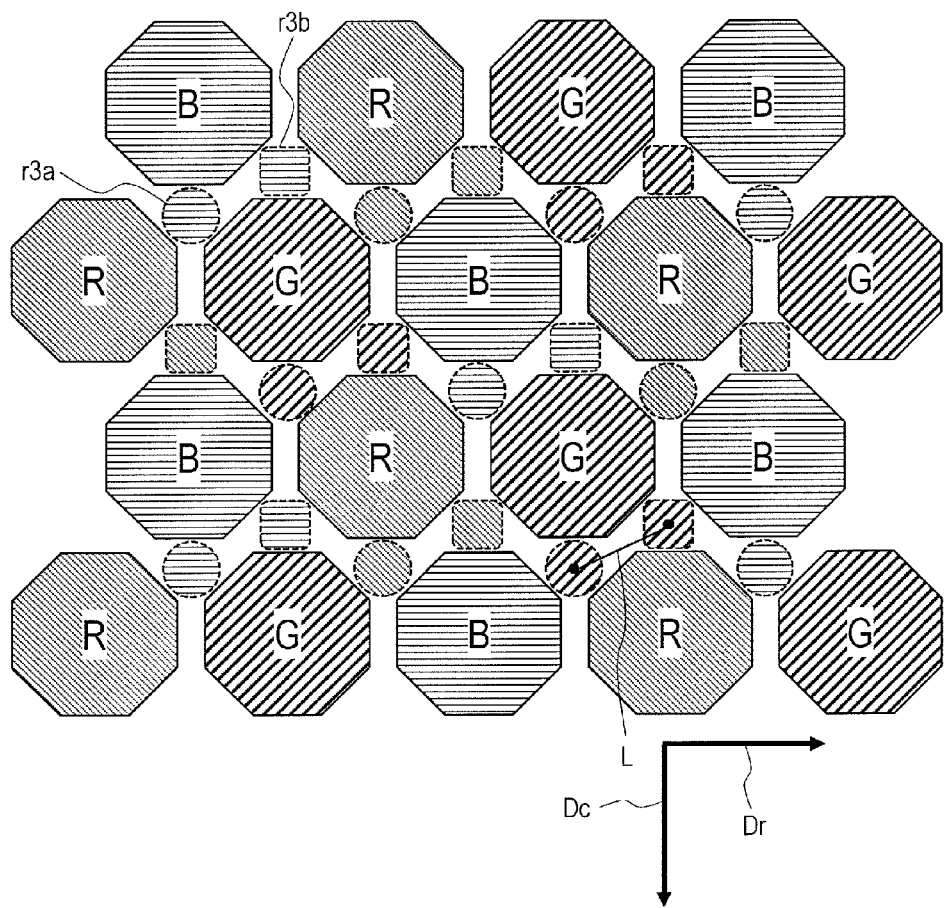
FIG. 6 Illustrates relative positions of first and second tricolor boundary regions r3a and r3b with respect to red, green and blue pixels R, G and B.

Next, the relation between the first and second tricolor boundary regions r3a and r3b will be described in further detail with reference to FIG. 6, which illustrates relative positions of the first and second tricolor boundary regions r3a and r3b with respect to the red, green and blue pixels R, G and B. In FIG. 6, a pixel representing one color and the first and second tricolor boundary regions r3a and r3b which are associated with that pixel (i.e., in which a TFT 12, a columnar spacer 40, a contact hole 13a and a storage capacitor associated with that pixel are arranged) are indicated by the same kind of hatching.

As can be seen from FIG. 6, when attention is paid to the first and second tricolor boundary regions r3a and r3b associated with an arbitrary one of the multiple pixels, it can be seen that two of the red, green and blue pixels R, G and B defining the first tricolor boundary region r3a are the same as two of the red, green and blue pixels R, G and B defining the second tricolor boundary region r3b and that the other of the red, green and blue pixels R, G and B defining the first tricolor boundary region r3a is located at a different position from the other of the red, green and blue pixels R, G and B defining the second tricolor boundary region r3b.

For example, look at the blue pixel B that is located at the leftmost position on the first row of pixels shown in FIG. 6. The first tricolor boundary region r3a associated with this blue pixel B is defined between this blue pixel B and the red and green pixels R and G that are respectively located at the leftmost and the second leftmost positions on the second row of pixels. On the other hand, the second tricolor boundary region r3b is defined between this blue pixel. B, the red pixel R that is located at the second leftmost position on the first row of pixels, and the green pixel G that is located at the second leftmost position on the second row of pixels.

Also, the first and second tricolor boundary regions r3a and r3b associated with each pixel are located at mutually different positions in the column direction Dc. In FIG. 6, the first tricolor boundary region r3a is located below the second tricolor boundary region r3b. In other words, the second tricolor boundary region r3b is located above the first tricolor boundary region r3a. That is why the line L which connects together respective approximate centers of the first and second tricolor boundary regions r3a and r3b associated with an arbitrary one of the multiple pixels is tilted with respect to the row direction Dr and the column direction Dc as shown in FIG. 6. In this manner, the first and second tricolor boundary regions r3a and r3b are located at mutually different positions in the column direction Dc because each pixel has a substantially regular octagonal shape (and more specifically because rows of pixels, each consisting of such pixels, are arranged so as to shift from each other by a half pitch).

The liquid crystal display device 100 with such a configuration achieves good enough display quality while maintaining a sufficiently high aperture ratio. Before the reason is described, it will be described with reference to FIGS. 7 and 8 why it is difficult for liquid crystal display devices 700 and 800 representing Comparative Examples 1 and 2 to achieve good display quality and increase the aperture ratio at a time.

Figure 7:
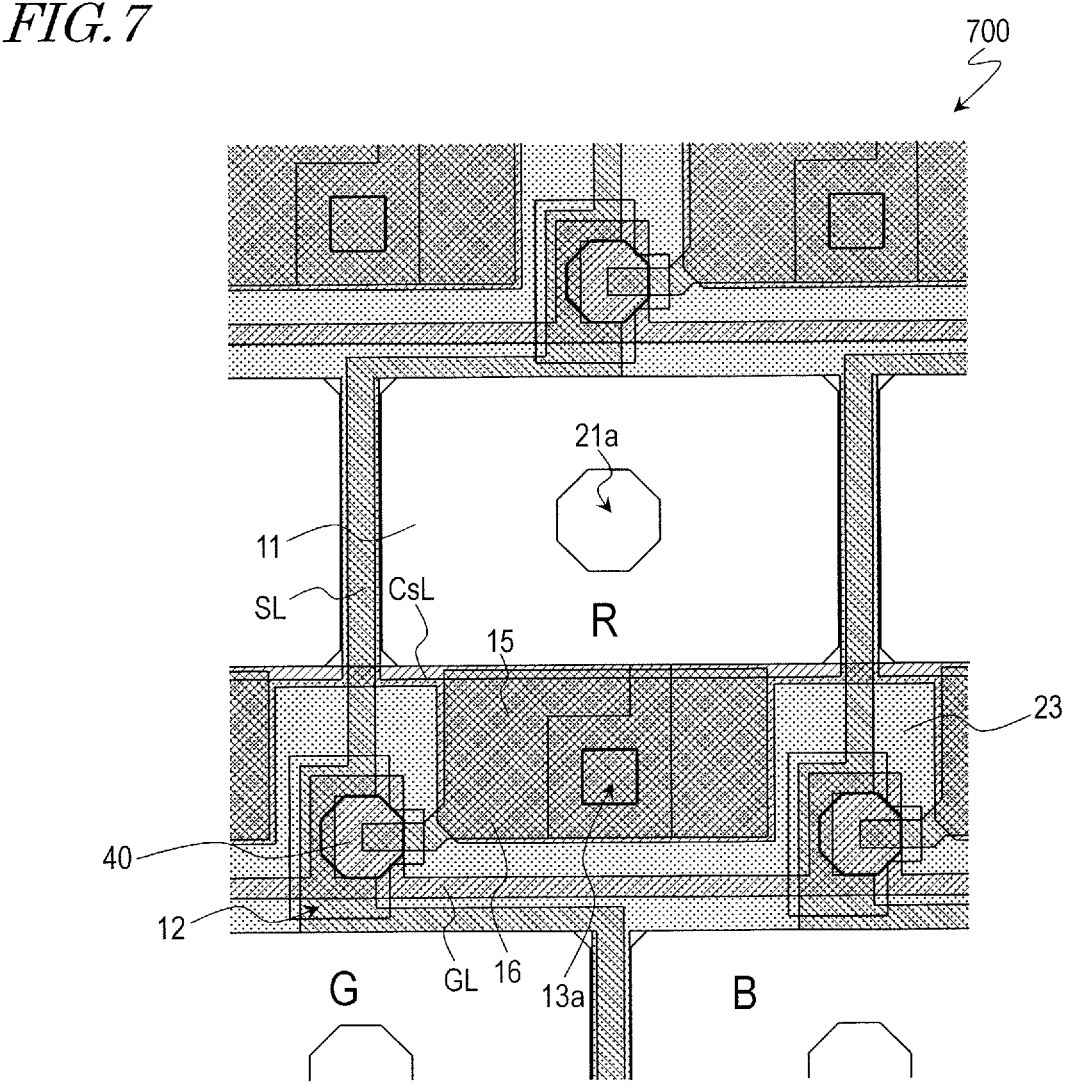
FIG. 7 A plan view schematically illustrating a liquid crystal display device 700 as Comparative Example 1.
Figure 8:
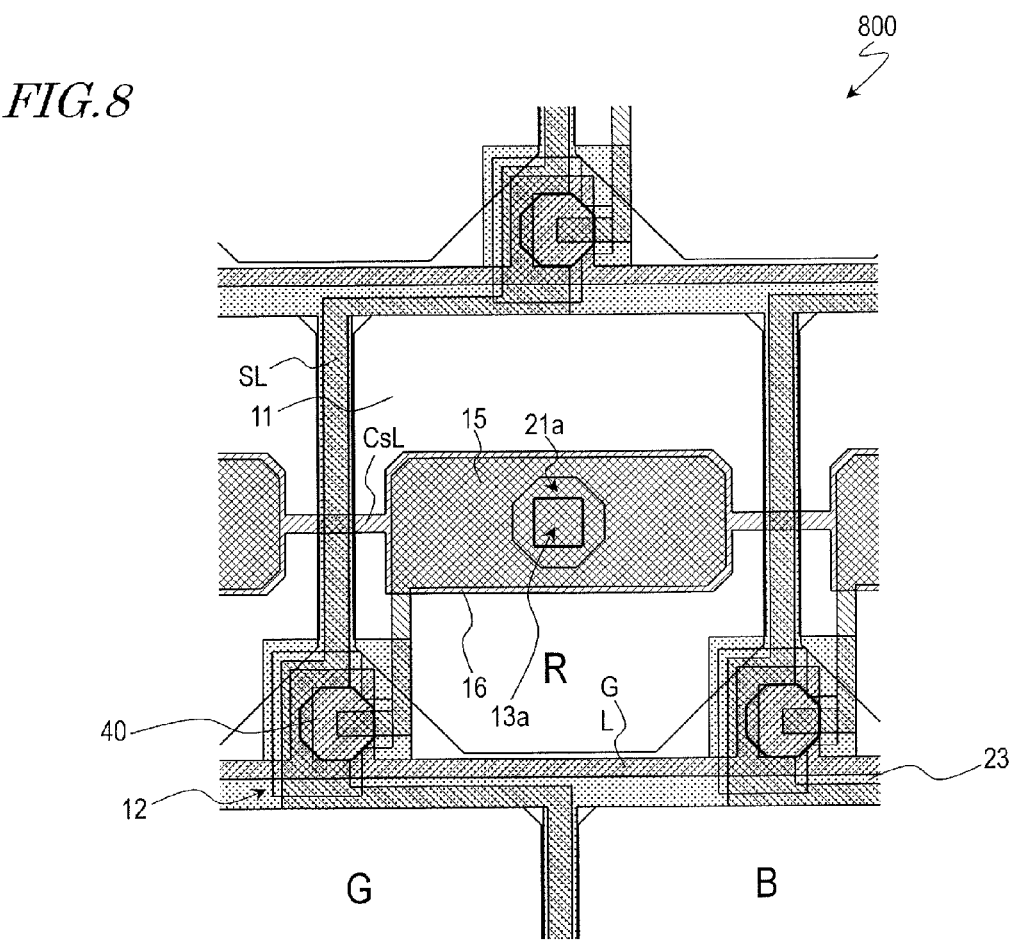
FIG. 8 A plan view schematically illustrating a liquid crystal display device 800 as Comparative Example 2.

In FIGS. 7 and 8, any component of the liquid crystal display devices 700 and 800 also included in the liquid crystal display device 100 of this embodiment and having substantially the same function as its counterpart is identified by the same reference numeral as its counterpart's.

In the liquid crystal display device 700 of Comparative Example 1 shown in FIG. 7, each pixel has a rectangular shape, which is a major difference from the liquid crystal display device 100 of this embodiment. In this liquid crystal display device 700, the TFT 12, columnar spacer 40, contact hole 13a and storage capacitor associated with each pixel are arranged outside of that pixel so as to overlap with the opaque portion of the opaque layer 23. On the other hand, the scan lines GL and signal lines SL are arranged so as to overlap entirely with the opaque portion of the opaque layer 23.

In the liquid crystal display device 800 of Comparative Example 2 shown in FIG. 8, each pixel has a rectangular shape which is notched at two out of the four corners (i.e., at the lower two corners shown in FIG. 8), which is a major difference from the liquid crystal display device 100 of this embodiment. In this liquid crystal display device 800, the TFT 12 and columnar spacer 40 associated with each pixel are arranged outside of that pixel so as to overlap with the opaque portion of the opaque layer 23. On the other hand, the contact hole 13a and storage capacitor associated with each pixel are arranged so as to overlap with the hole 21a that is the center of alignment (i.e., arranged inside that pixel). The scan lines GL and signal lines SL are arranged so as to overlap entirely with the opaque portion of the opaque layer 23.

Compare the devices shown in FIGS. 7 and 8 to each other, and it can be seen that the distance from the center of alignment to an edge of the pixel electrode 11 is shorter in the liquid crystal display device 700 of Comparative Example 1 than in the liquid crystal display device 800 of Comparative Example 2. That is why in the liquid crystal display device 700 of Comparative Example 1, stabilized axisymmetric alignments can be induced more easily in a shorter time and good enough display quality can be achieved more easily. However, in the liquid crystal display device 700 of Comparative Example 1, the percentage that the opaque portion accounts for in the display area increases so much that the aperture ratio sometimes decreases.

On the other hand, the liquid crystal display device 800 of Comparative Example 2 can have a higher aperture ratio than the liquid crystal display device 700 of comparative example 1. However, in the liquid crystal display device 800 of Comparative Example 2, the distance from the center of alignment to an edge of the pixel electrode 11 increases too much to achieve good enough display quality easily.

For these reasons, it is difficult for the liquid crystal display devices 700 and 800 of Comparative Examples 1 and 2 to achieve good enough display quality and increase the aperture ratio at the same time.

In the liquid crystal display device 100 of this embodiment, each of the plurality of pixels (consisting of red, green and blue pixels R, G and B) has a substantially regular octagonal shape, and each pixel electrode 11 includes a substantially regular octagonal portion (which will be hereinafter referred to as just an "octagonal portion"). That is why the distance from the center of alignment to any edge of the pixel electrode 11 is substantially uniform within each pixel, and therefore, stabilized axisymmetric alignments can be induced in a short time and good enough display quality can be achieved.

Also, in the liquid crystal display device 100 of this embodiment, the TFT 12 and column spacer 40 are arranged in the first tricolor boundary region r3a, the contact hole 13a and storage capacitor are arranged in the second tricolor boundary region r3b, and the first and second tricolor boundary regions r3a and r3b are located at mutually different positions in the column direction Dc. That is why compared to a situation where the first and second tricolor boundary regions r3a and r3b are located at the same position in the column direction Dc (i.e., a situation where the first and second tricolor boundary regions r3a and r3b are arranged in line horizontally), the distance between the columnar spacer 40 and the contact hole 13a can be increased. That is why the columnar spacer 40 can be brought into contact with the TFT substrate 10 in a region other than a non-flat region surrounding the contact hole 13a, and the cell gap can be more uniform. As a result, the display quality can be further improved.

Optionally, the first tricolor boundary region r3a in which the TFT 12 and columnar spacer 40 are arranged and the second tricolor boundary region r3b in which the contact hole 13a and storage capacitor are arranged may have their positions changed with each other.

Also, in a region near the columnar spacer 40 and in a region near the contact hole 13a, the liquid crystal molecules 31 may have their alignments disturbed easily. And those regions need to be shielded from incoming light. In the liquid crystal display device 100 of this embodiment, however, the columnar spacer 40 and contact hole 13a are arranged in the first and second tricolor boundary regions r3a and r3b, respectively, which are outside of the pixel (and which are designed to be shielded from light from the beginning), and therefore, the aperture ratio can be increased.

Furthermore, in the liquid crystal display device 100 of this embodiment, the scan lines GL and signal lines SL overlap partially with the pixel electrodes 11 when viewed along a normal to the display screen, and therefore, the aperture ratio can be further increased. The reasons will be described below. Specifically, the storage capacitor electrodes 15 and storage capacitor counter electrodes 16 are formed out of the same conductive film (i.e., a source metal and a gate metal) as the signal lines SL and the scan lines GL, respectively. However, the storage capacitor electrodes 15 and the signal lines SL are electrically independent of each other, so are the storage capacitor counter electrodes 16 and the scan lines GL. That is why each storage capacitor needs to be arranged at a certain distance from the scan line GL and signal line SL, which prevents the designer from arranging the TFT 12 and storage capacitor efficiently outside of the pixel (and which would cause a decrease in aperture ratio in the configuration shown in FIG. 7). On the other hand, if the scan lines GL and signal lines SL are arranged so as to overlap with the pixel electrodes 11 (i.e., arranged inside the pixels) as is done in this embodiment, the region between each scan line GL and its associated storage capacitor and the region between each signal line SL and its associated storage capacitor can also contribute to conducting a display operation. As a result, the TFT 12 and the storage capacitor can be arranged efficiently outside of the pixel and the aperture ratio can be increased. In addition, a sufficient interval can be left between the scan line GL and the storage capacitor and between the signal line SL and the storage capacitor without sacrificing the aperture ratio, and therefore, the process yield can be increased as well.

It should be noted that the regions defined between pixels include not only "tricolor boundary regions" such as the first and second tricolor boundary regions r3a and r3b but also "bicolor boundary regions" as well. Specifically, the bicolor boundary region is a region defined between red and green pixels R and G which are adjacent to each other in the row direction, between green and blue pixels G and B which are adjacent to each other in the row direction, or between blue and red pixels B and R which are adjacent to each other in the row direction. As shown in FIG. 1, a portion of the signal line SL and a projection 16a are arranged in the bicolor boundary region r2, and therefore, the degree of color mixture to be caused when the screen is viewed obliquely can be reduced. In addition, since unwanted leakage of light can also be reduced, the contrast ratio can be increased as well.

Furthermore, in the liquid crystal display device 100 of this embodiment, the red, green and blue color filters 22R, 22G and 22B each have a substantially hexagonal shape, and are arranged in the color filter layer 22 with substantially no gap left between them. Although a level difference is created in the boundary between color filters in different colors, the overall length of such boundaries can be minimized, and the degree of unevenness on the counter substrate 20 can be reduced by forming those color filters in such a substantially hexagonal shape. Furthermore, the portion to be located under the columnar spacer 40 should have a particularly high degree of planarity. However, by arranging color filters (which are any of the red, green and blue color filters 22R, 22G and 22B) on the opaque portion of the opaque layer 23, too, as is done in this embodiment, that portion to be located under the columnar spacer 40 can afford to have such a high degree of planarity. This configuration is applicable particularly effectively to a situation where no overcoat layer is provided to secure a degree of planarity.

Embodiment 2

Figure 9:
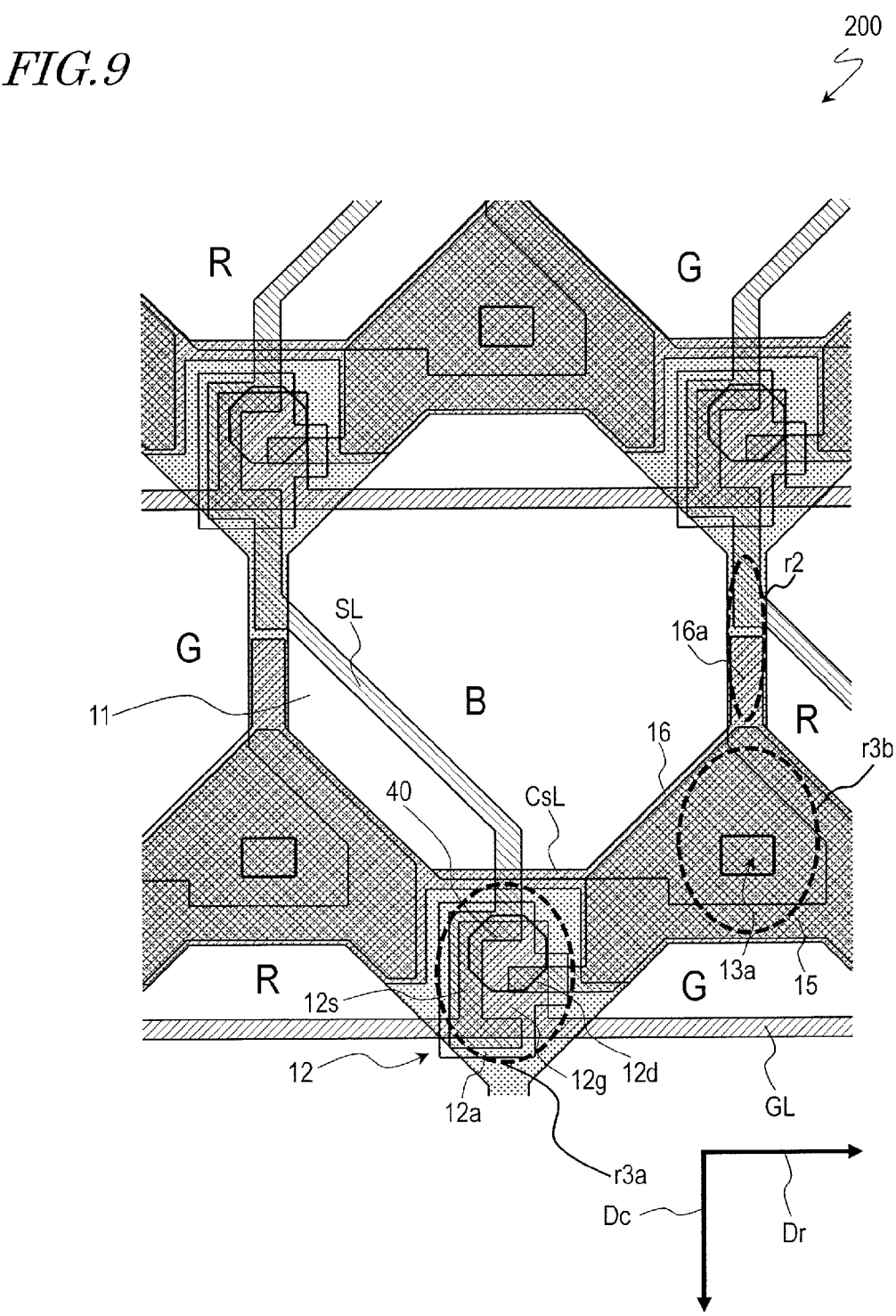
FIG. 9 A plan view schematically illustrating a liquid crystal display device 200 according to an embodiment of the present invention.
Figure 10:
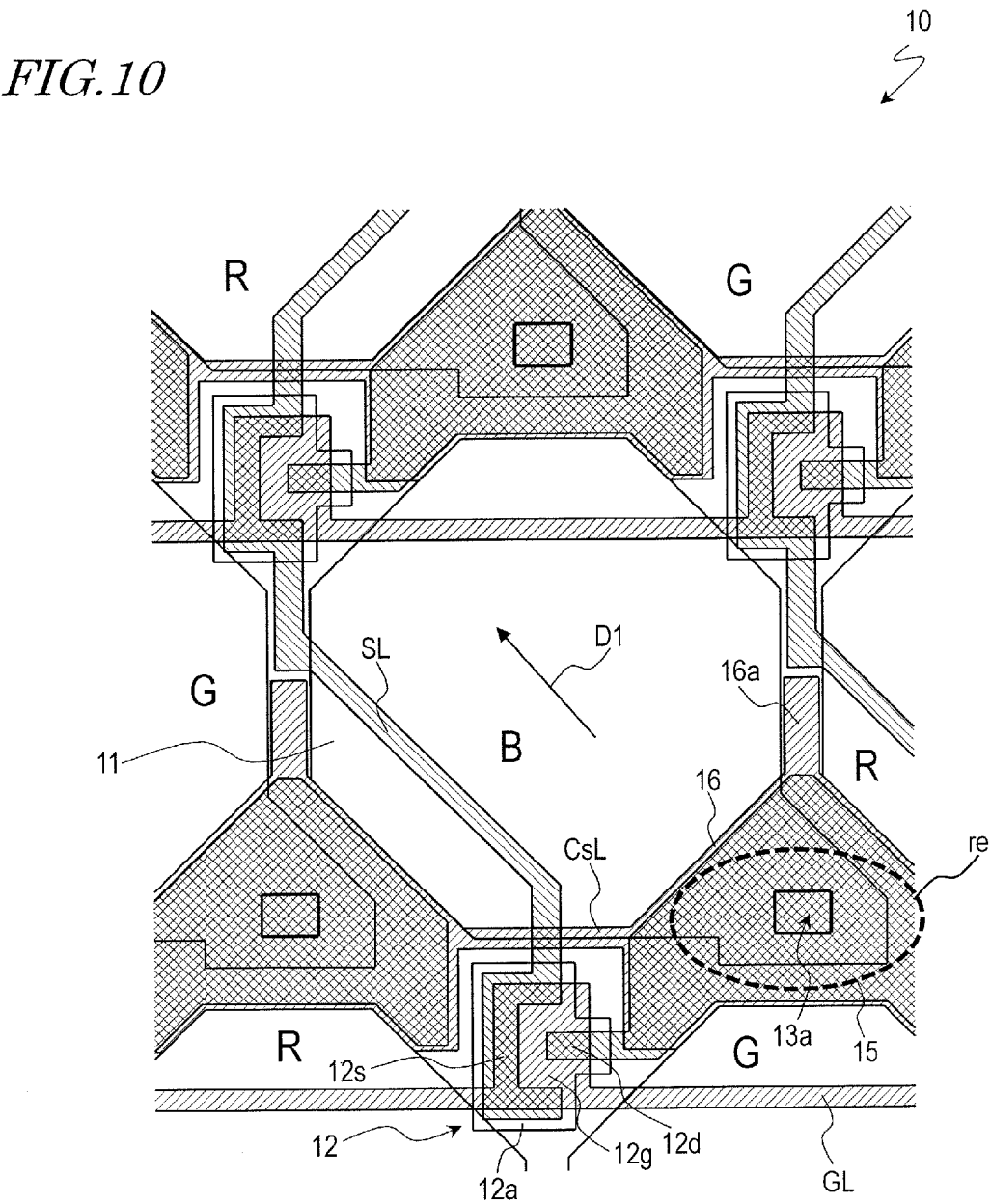
FIG. 10 A plan view schematically illustrating the configuration of a TFT substrate 10 that the liquid crystal display device 200 includes.

Next, a liquid crystal display device 200 as a second embodiment will be described with reference to FIGS. 9 and 10. FIG. 9 is a plan view schematically illustrating the liquid crystal display device 200, and FIG. 10 is a plan view schematically illustrating the configuration of the TFT substrate 10 of the liquid crystal display device 200.

In the liquid crystal display device 200 of this embodiment, each of the red, green and blue pixels R, G and B also has a substantially regular octagonal shape, and the pixel electrode 11 also has a substantially regular octagonal portion (which will be hereinafter referred to as just an "octagonal portion"). The TFT 12 and columnar spacer 40 are arranged in the first tricolor boundary region r3a, and the contact hole 13a and storage capacitor are arranged in the second tricolor boundary region r3b. The first and second tricolor boundary regions r3a and r3b are located at different positions in the column direction Dc. Furthermore, when viewed along a normal to the display screen, the scan lines GL and signal lines SL overlap partially with the pixel electrodes 11. Consequently, this liquid crystal display device 200 can also achieve good enough display quality while maintaining a sufficiently high aperture ratio.

However, the liquid crystal display device 200 of this embodiment conducts a display operation in the TN (Twisted Nematic) mode, which is a major difference from the liquid crystal display device 100 of the first embodiment. Thus, the liquid crystal layer (not shown) of the liquid crystal display device 200 is a horizontal alignment liquid crystal layer, and the pair of alignment films (not shown) are horizontal alignment films. Furthermore, no hole has been cut through the counter electrode (not shown).

Each of the two alignment films has been subjected to a rubbing treatment. FIG. 10 indicates the rubbing direction D1 of the alignment film on the TFT substrate 10. As can be seen from FIGS. 9 and 10, the rubbing direction D1 of the alignment film on the TFT substrate 10 points from the second tricolor boundary region r3b toward the center of its associated pixel. Specifically, the rubbing direction D1 points from the lower right corner toward the upper left corner on the paper on which FIG. 10 is drawn.

Furthermore, the pixel electrode 11 of this liquid crystal display device 200 has a different shape from the pixel electrode 11 of the liquid crystal display device 100 of the first embodiment, and has a shape in which no edges of the pixel electrode 11 are present in the boundary between the second tricolor boundary region r3b and its associated pixel. FIG. 11(a) illustrates the pixel electrode 11 of this liquid crystal display device 200. On the other hand, FIG. 11(b) illustrates the pixel electrode 11 of the liquid crystal display device 100 of the first embodiment for the purpose of comparison.

The pixel electrodes 11 shown in FIGS. 11(a) and 11(b) each include a substantially regular octagonal portion (which will be hereinafter simply referred to as an "octagonal portion") 11a and a portion 11b extended from the octagonal portion 11a toward the contact hole 13a (which will be hereinafter referred to as a "connecting portion"). Nevertheless, the connecting portion 11b of the pixel electrode 11 shown in FIG. 11(a) is extended from the octagonal portion 11a at a broader width (specifically, at as broad a width as one side of the octagonal portion 11a) than the connecting portion 11b of the pixel electrode 11 shown in FIG. 11(b). As a result, in this liquid crystal display device 200, there are no edges of the pixel electrode 11 in the boundary between the second tricolor boundary region r3b and its associated pixel.

If the alignment film on the TFT substrate 10 is subjected to a rubbing treatment, alignment errors are easily caused around an edge of the pixel electrode 11 which is located upstream during the rubbing treatment. However, if the pixel electrode 11 has such a shape that no edges thereof are present in the boundary between the second tricolor boundary region r3b and its associated pixel as in this embodiment, such a region re where alignment errors could occur can be shifted further outward with respect to the pixel, and can be shielded with the storage capacitor electrode 15 or the storage capacitor counter electrode 16 with more certainty. As a result, good enough display quality can be achieved.

Embodiment 3

Figure 12:
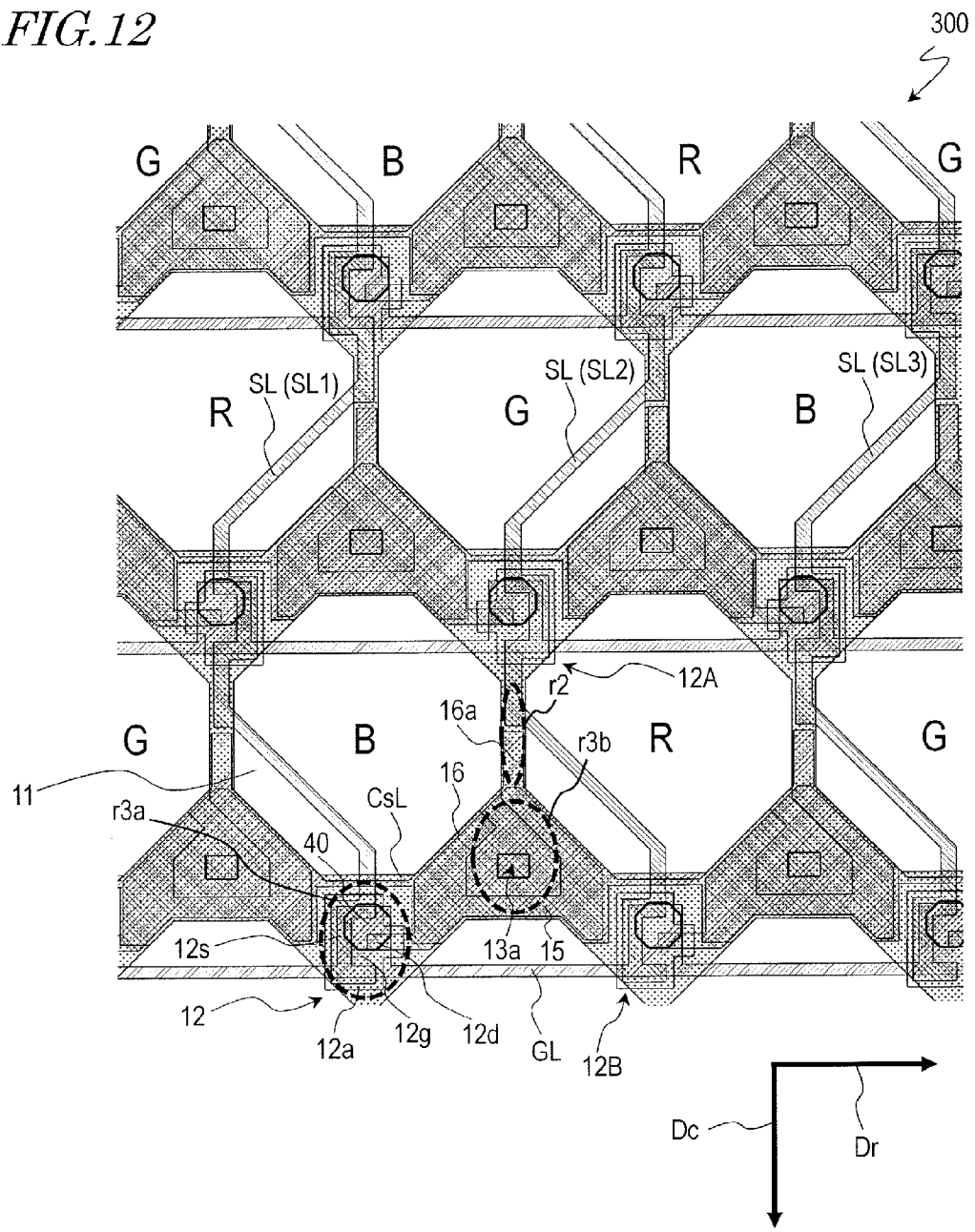
FIG. 12 A plan view schematically illustrating a liquid crystal display device 300 according to an embodiment of the present invention.

Next, a liquid crystal display device 300 as a third embodiment will be described with reference to FIGS. 12 and 13. FIG. 12 is a plan view schematically illustrating the liquid crystal display device 300, and FIG. 13 is a plan view schematically illustrating the configuration of the TFT substrate 10 of the liquid crystal display device 300.

In the liquid crystal display device 300 of this embodiment, each of the red, green and blue pixels R, G and B also has a substantially regular octagonal shape, and the pixel electrode 11 also has a substantially regular octagonal portion (which will be hereinafter referred to as just an "octagonal portion"). The TFT 12 and columnar spacer 40 are arranged in the first tricolor boundary region r3a, and the contact hole 13a and storage capacitor are arranged in the second tricolor boundary region r3b. The first and second tricolor boundary regions r3a and r3b are located at different positions in the column direction Dc. Furthermore, when viewed along a normal to the display screen, the scan lines GL and signal lines SL overlap partially with the pixel electrodes 11. Consequently, this liquid crystal display device 300 can also achieve good enough display quality while maintaining a sufficiently high aperture ratio.

However, in the liquid crystal display device 300 of this embodiment, the structure of the TFTs 12 inverts every row of pixels, which is a major difference from the liquid crystal display device 100 of the first embodiment.

Figure 13:
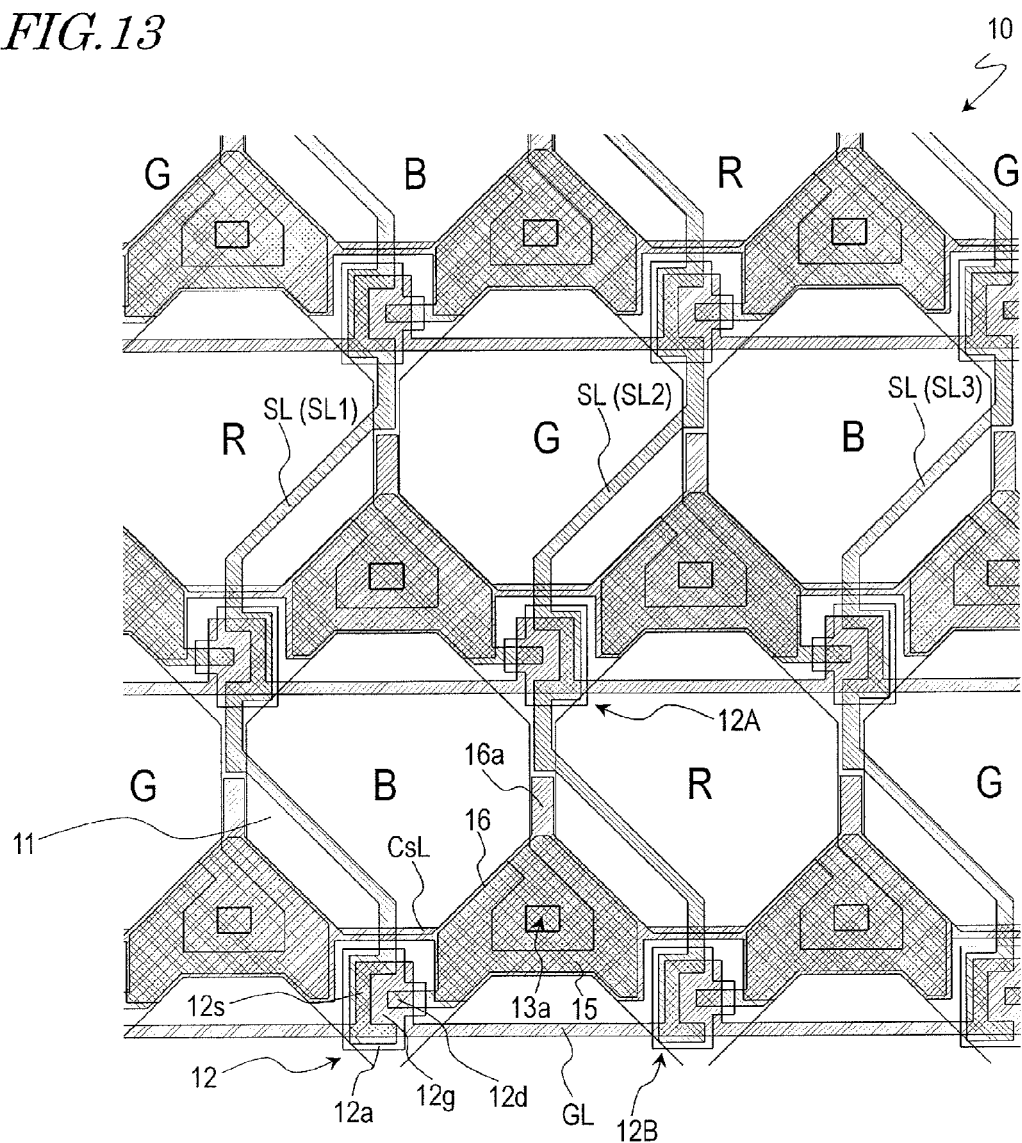
FIG. 13 A plan view schematically illustrating the configuration of a TFT substrate 10 that the liquid crystal display device 300 includes.

As shown in FIGS. 12 and 13, multiple TFTs 12 are connected to each signal line SL. In this embodiment, one of the multiple TFTs 12 that are connected to a signal line SL and another TFT 12 that is adjacent to the former one have structures which are symmetric to each other with respect to an axis that is a line drawn parallel to the column direction Dc. For example, look at the TFT 12A which is located at substantially the center in FIGS. 12 and 13 and the TFT 12B which is located on the lower right of the TFT 12A, and it can be seen that these TFTs 12A and 12B have structures which are horizontally inverted from each other. Specifically, in the TFT 12A, the source electrode 12s is located on the right-hand side and the drain electrode 12d is located on the left-hand side. On the other hand, in the TFT 12B, the source electrode 12s is located on the left-hand side and the drain electrode 12d is located on the right-hand side.

Since the multiple TFTs 12 connected to each signal line SL have such structures, those TFTs 12 which are connected to an arbitrary one of the multiple signal lines SL can be only ones associated with pixels in the same color. For example, among the three signal lines SL12 shown in FIG. 12, only TFTs 12 associated with blue pixels B are connected to the signal line SL1 on the left-hand side, only TFTs 12 associated with red pixels R are connected to the middle signal line SL2, and only TFTs 12 associated with green pixels G are connected to the signal line SL3 on the right-hand side.

That is why only a display signal representing one primary color (which is one of the colors red, green and blue) is supplied from a signal line driver to each signal line SL. Consequently, a decline in display quality which would otherwise be caused when display signals representing multiple different colors are present on the same signal line can be minimized, and the display quality can be further improved.

On the other hand, in the liquid crystal display device 100 of the first embodiment, TFTs 12 associated with blue and red pixels B and R are connected to the left one of the two signal lines SL shown in FIG. 1 and TFTs 12 associated with red and green pixels R and G are connected to the other right signal line SL. Thus, display signals supplied from a signal line driver to each signal line SL include not only a display signal representing one primary color but also a display signal representing another primary color as well in the same mix. Consequently, the display quality could be debased due to such coexistence of different kinds of display signals in the same mix. Specifically, when a particular image is displayed, a color tone shift could be produced due to crosstalk caused by capacitance that has been formed between a signal line SL and a pixel electrode 11.

Embodiment 4

Figure 14:
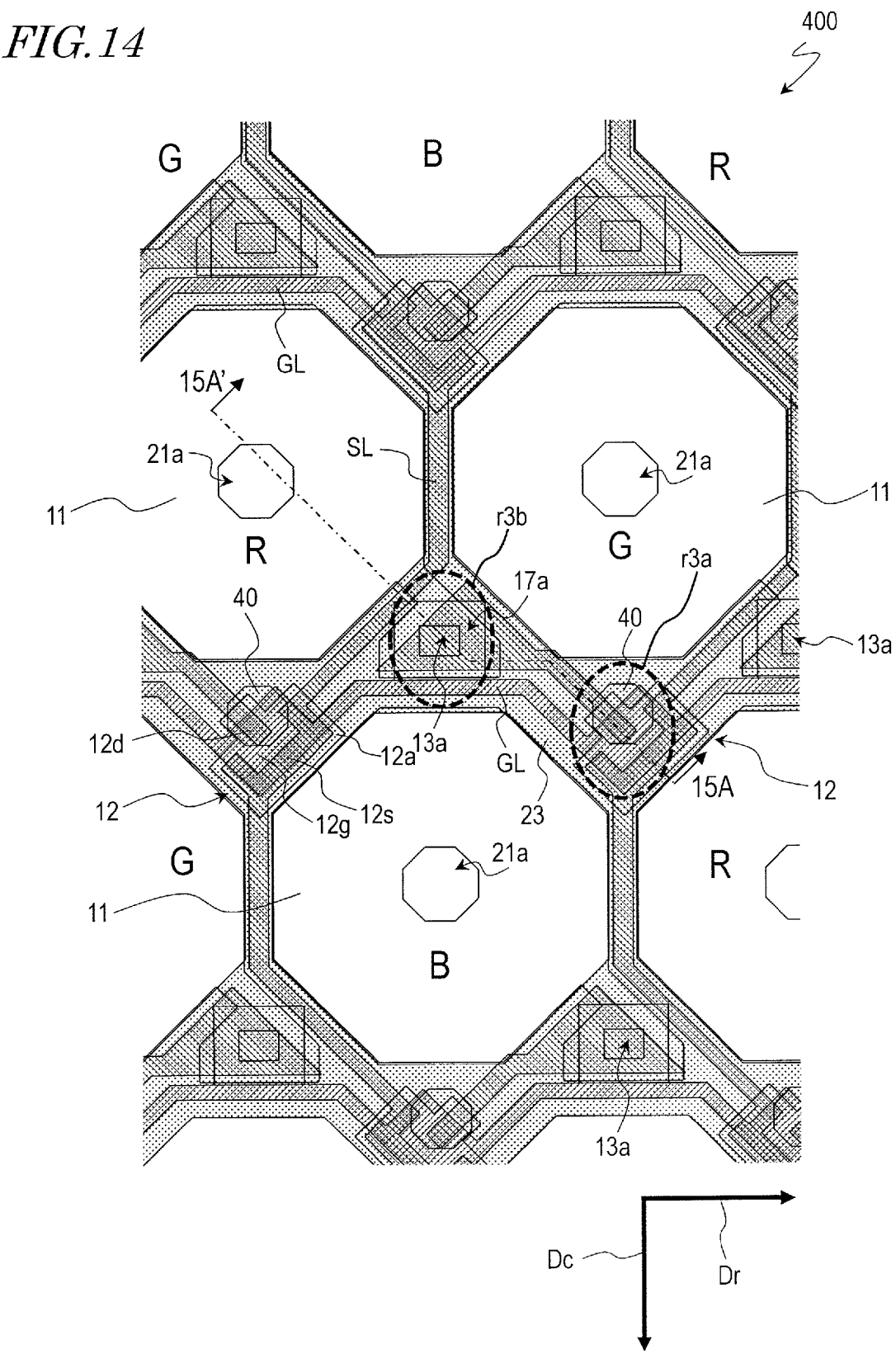
FIG. 14 A plan view schematically illustrating a liquid crystal display device 400 according to an embodiment of the present invention.
Figure 15:
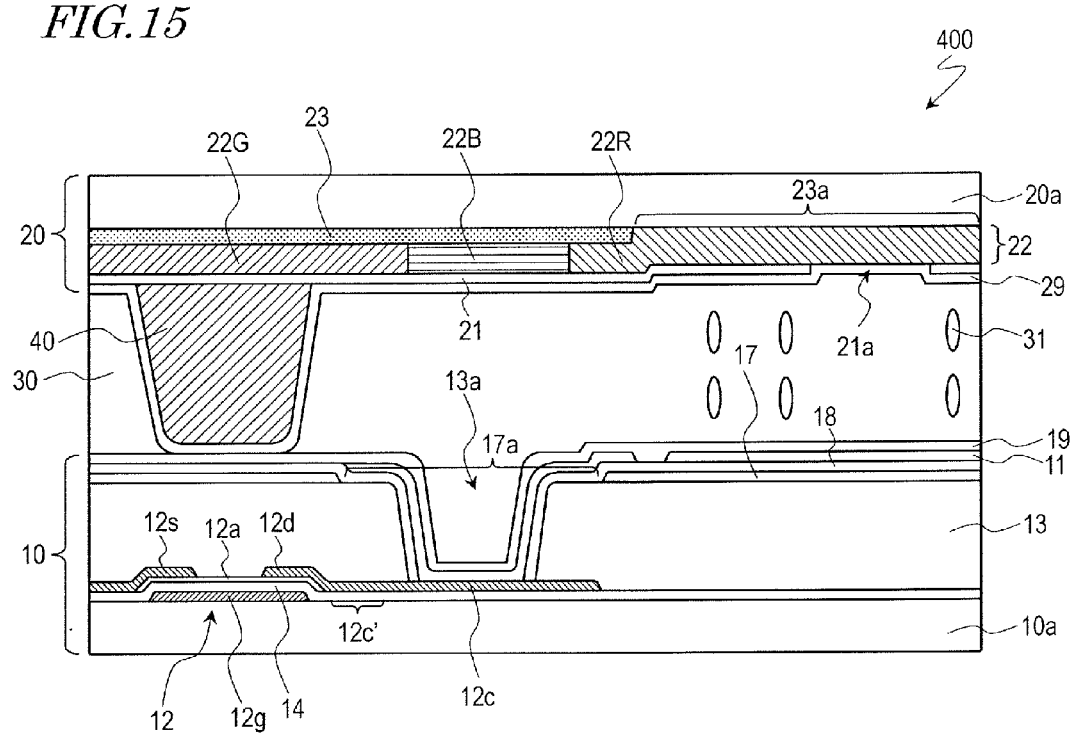
FIG. 15 A cross-sectional view schematically illustrating the liquid crystal display device 400 as viewed on the plane 15A-15A' shown in FIG. 14.
Figure 16:
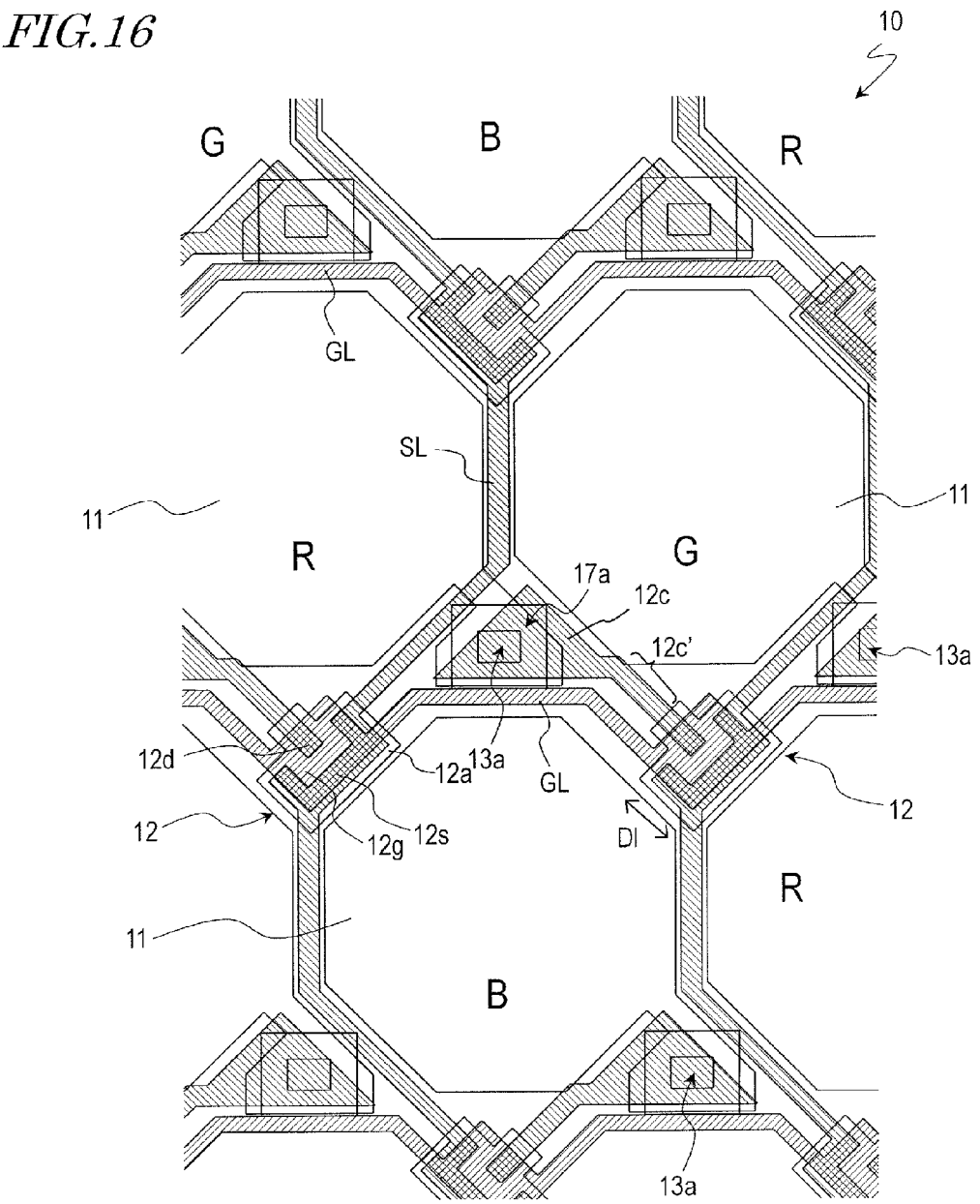
FIG. 16 A plan view schematically illustrating the configuration of a TFT substrate 10 that the liquid crystal display device 400 includes.
Figure 17:
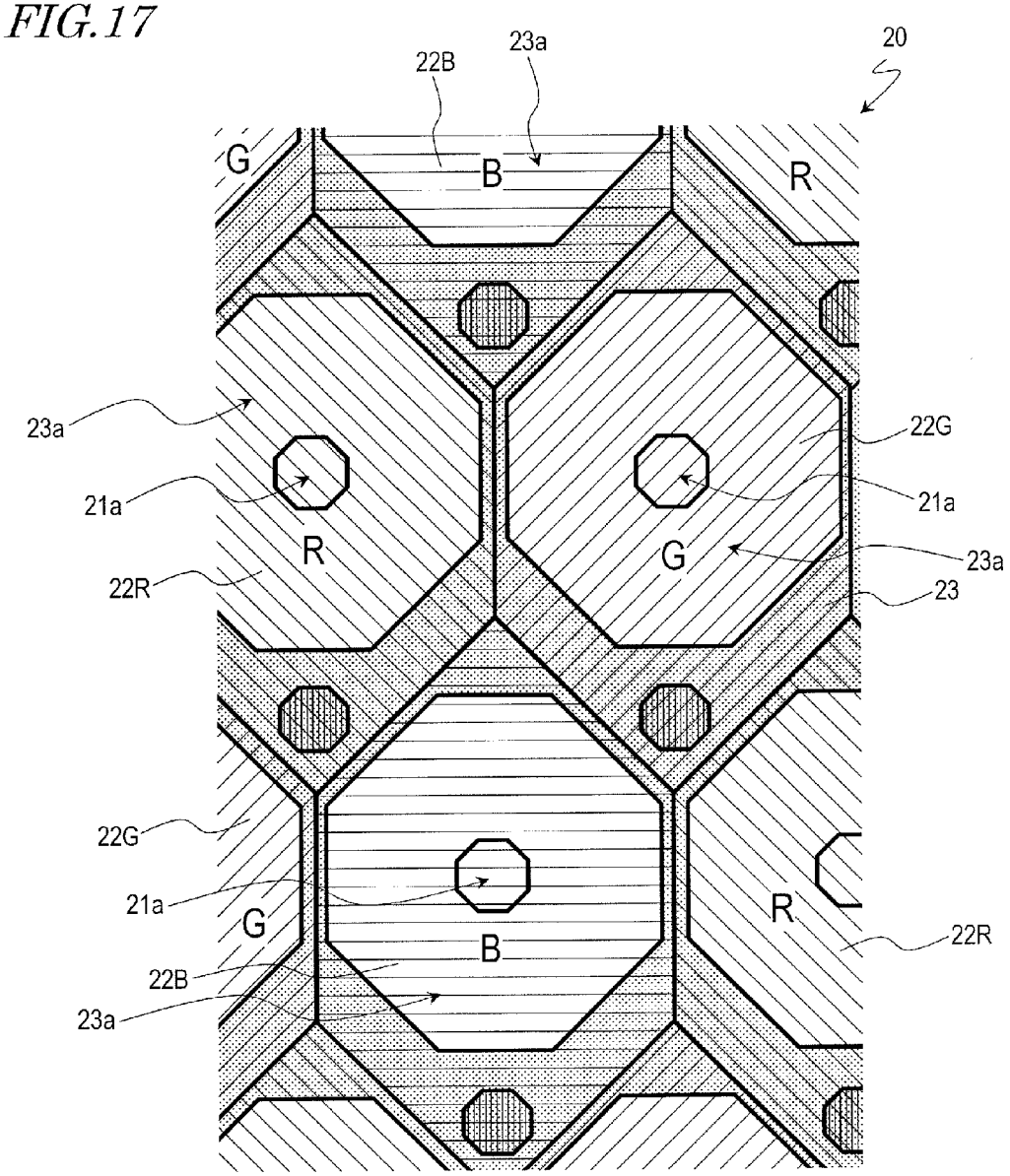
FIG. 17 A plan view schematically illustrating the configuration of a counter substrate 20 that the liquid crystal display device 400 includes.

Next, a liquid crystal display device 400 as a fourth embodiment will be described with reference to FIGS. 14 to 17. FIG. 14 is a plan view schematically illustrating the liquid crystal display device 400. FIG. 15 is a cross-sectional view as viewed on the plane 15A-15A' shown in FIG. 14. FIG. 16 is a plan view schematically illustrating the configuration of the TFT substrate 10 of the liquid crystal display device 400. And FIG. 17 is a plan view schematically illustrating the configuration of the counter substrate 20 of the liquid crystal display device 400.

In the liquid crystal display device 400 of this embodiment, each of the red, green and blue pixels R, G and B also has a substantially regular octagonal shape, and the pixel electrode 11 also has a substantially regular octagonal portion (which will be hereinafter referred to as just an "octagonal portion"). The TFT 12 and columnar spacer 40 are arranged in the first tricolor boundary region r3a, and the contact hole 13a is arranged in the second tricolor boundary region r3b. The first and second tricolor boundary regions r3a and r3b are located at different positions in the column direction Dc.

In the liquid crystal display device 400, the TFT substrate 10 includes a transparent electrode (which will be hereinafter referred to as a "lower electrode") 17 which overlaps with the pixel electrodes 11 with a dielectric layer 18 interposed between them, which is a major difference from the liquid crystal display device 100 of the first embodiment.

The transparent electrode 17 is made of a transparent conductive material (such as ITO or IZO) and is arranged on the interlayer insulating layer 13. The dielectric layer 18 has been formed to cover the transparent electrode 17 and the pixel electrodes 11 are arranged on the dielectric layer 18.

In the liquid crystal display device 400 of this embodiment, a storage capacitor is formed by the pixel electrode 11, the transparent electrode 17, and the dielectric layer 18 interposed between the pixel electrode 11 and the transparent electrode 17. A Cs voltage is supplied to the transparent electrode 17. The transparent electrode 17 is continuous over the entire display area and has a hole 17a only in the vicinity of the contact hole 13a. Thus, in this embodiment, the storage capacitor is formed in almost the entire area inside a pixel.

In the liquid crystal display device 400 of this embodiment, a storage capacitor is formed by the pixel electrode 11 and the transparent electrode 17 as described above, and therefore, the storage capacitor lines CsL and storage capacitor counter electrode 16 provided for the liquid crystal display device 100 of the first embodiment are no longer needed. As a result, the aperture ratio can be further increased. In addition, since there is no need to provide the storage capacitor lines CsL or storage capacitor counter electrodes 16 anymore, the yield can be increased, too.

Furthermore, in the liquid crystal display device 400 of this embodiment, the structures of the TFTs 12 invert every row of pixels as in the liquid crystal display device 300 of the third embodiment. That is to say, one of the multiple TFTs 12 that are connected to a signal line SL and another TFT 12 that is adjacent to the former one have structures which are symmetric to each other with respect to an axis that is a line drawn parallel to the column direction Dc. By adopting such a configuration, obliquely running portions of the connection line 12c which is extended from the drain electrode 12d toward the contact hole 13a and the scan lines GL will not interfere with the signal lines SL easily, and therefore, respective elements can be arranged even more efficiently under the opaque portion of the opaque layer 23.

In addition, those TFTs 12 which are connected to an arbitrary one of the multiple signal lines SL are only ones associated with pixels in the same color. Consequently, only a display signal representing one primary color is supplied from a signal line driver to each signal line SL. As a result, the following advantages can be achieved.

In this liquid crystal display device 400, the transparent electrode 17 is located between the signal line SL and the pixel electrode 11, and therefore, the capacitance produced between the signal line SL and the pixel electrode 11 becomes sufficiently small. In such a configuration in which the capacitance between the signal line and the pixel electrode becomes sufficiently small, source line inversion driving (which is also called "column inversion driving") is often adopted to reduce the power to drive the signal line. According to the source line inversion driving, a display signal supplied to an arbitrary signal line continues to have the same polarity within a frame, and a display signal with the opposite polarity is supplied to a signal line adjacent to the former signal line. And the polarity of a display signal supplied to each signal line inverts every frame. In a general liquid crystal display device, dot inversion driving or gate line inversion driving is often adopted.

With the source line inversion driving adopted, if only a display signal representing a certain primary color is supplied to each signal line SL as in the liquid crystal display device 400 of this embodiment, the driving frequency for the signal line SL can be substantially lowered when a single solid color image is displayed, for example. As a result, the power dissipation can be further cut down.

On the other hand, if a single signal line is in charge of representing the two colors of red and green, for example, a display signal representing a red pixel (in the middle or the highest grayscale) and a display signal representing a green pixel (in the lowest grayscale) need to be input alternately to that signal line within a frame to display a solid red image. As a result, the frequency increases substantially and the power dissipation rises.

In the liquid crystal display device 400 of the fourth embodiment, the channel length direction D1 of the TFT 12 (see FIG. 16) defines a tilt angle (of approximately 45 degrees in this example) with respect to the row direction Dr. Thus, it can be said that the arrangement of the TFT 12 in the liquid crystal display device 400 defines a tilt angle of approximately 45 degrees with respect to that of the TFT 12 in the liquid crystal display device 300 of the third embodiment. However, there is no problem with its drivability at all. Also, the connection line 12c has a portion 12c' which runs straight in a direction that defines a tilt angle (of approximately 45 degrees in this example) with respect to the row direction Dr. By adopting such a configuration, the efficiency of arranging lines and other members outside of a pixel can be further increased and an even higher aperture ratio can be achieved.

Also, the contact hole 13a may have any shape corresponding to that of the opaque portion of the opaque layer 23. Thus, the contact hole 13a does not have to have a substantially rectangular shape as illustrated on the drawings, but may also have a substantially triangular or substantially pentagonal shape as well.

Optionally, the configuration of this embodiment may be adopted in an FFS (Fringe Field Switching) mode liquid crystal display device. In that case, a plurality of slits will be cut through the pixel electrode 11, and the pixel electrode 11 and the transparent electrode 17 will function as not only a pair of electrodes to form a storage capacitor but also a pair of electrodes to generate a lateral electric field as well (i.e., the transparent electrode 17 will function as a common electrode). Meanwhile, there is no need to cut the hole 21a through the counter electrode 21.

Other Embodiments

In the first through fourth embodiments described above, each pixel is supposed to have a substantially regular octagonal shape. However, this is not the only pixel shape.

If each pixel (i.e., the outer periphery of an area contributing to a display operation as a display unit of each primary color) has a substantially polygonal shape with n vertices (where n is an integer which is equal to or greater than eight) or a substantially circular shape, the distances from the center of alignment to edges of the pixel electrode 11 can be more uniform than in a situation where the pixel has a substantially rectangular shape. As a result, the display quality can be improved effectively. Also, if each pixel has a substantially polygonal shape with n vertices, every interior angle of the pixel in such a substantially polygonal shape with n vertices is suitably less than 180 degrees. Also, to make the distances from the center of alignment to edges of the pixel electrode 11 uniform, the interior angles of the pixel are suitably as uniform as possible, and the pixel more suitably has a substantially regular polygonal shape with n vertices (e.g., a regular octagonal shape). That is to say, every interior angle suitably satisfies 180°×(n−2)/n. Also, if the pixel has a substantially circular shape, the shape of the pixel is suitably a substantially perfectly circular shape rather than a substantially elliptical shape from the same point of view. If the pixel has a substantially polygonal shape with n vertices, the pixel electrode 11 includes a portion in such a polygonal shape with n vertices. On the other hand, if the pixel has a substantially circular shape, the pixel electrode 11 includes a substantially circular portion.

To improve the display quality, each pixel suitably has either a substantially regular polygonal shape with n vertices or a substantially perfectly circular shape as described above. Depending on the shape (e.g., the aspect ratio) of the display area, however, a shape defined by extending either a regular polygon with n vertices or a perfect circle in the row direction or the column direction may be more beneficial in terms of the aperture ratio.

INDUSTRIAL APPLICABILITY

According to embodiments of the present invention, a liquid crystal display device including color filters with a delta arrangement can achieve good enough display quality and can increase the aperture ratio at the same time. A liquid crystal display device according to an embodiment of the present invention may be a liquid crystal display device which conducts a display operation in a vertical alignment mode (such as the CPA mode) or a liquid crystal display device which conducts a display operation in a horizontal alignment mode (such as the TN mode or the FFS mode).

REFERENCE SIGNS LIST 10 active-matrix substrate (TFT substrate)
10a, 20a transparent substrate
11 pixel electrode
11a octagonal portion
11b connecting portion
12 thin-film transistor (TFT)
12a semiconductor layer
12g gate electrode
12s source electrode
12d drain electrode
12c connection line
13 interlayer insulating layer
13a contact hole
14 gate insulating layer
15 storage capacitor electrode
16 storage capacitor counter electrode
17 transparent electrode
17a hole
18 dielectric layer
19, 29 alignment film
20 counter substrate (color filter substrate)
21 counter electrode
21a hole
22 color filter layer
22R red color filter
22G green color filter
22B blue color filter
23 opaque layer
23a hole
30 liquid crystal layer
31 liquid crystal molecule
40 columnar spacer
R red pixel
G green pixel
B blue pixel
GL scan line
SL signal line
CsL storage capacitor line
r2 bicolor boundary region
r3a first tricolor boundary region
r3b second tricolor boundary region
Dr row direction
Dc column direction
100, 200, 300, 400 liquid crystal display device

The invention claimed is:

1. A liquid crystal display device comprising:
a first substrate;
a second substrate which faces the first substrate;
a liquid crystal layer which is interposed between the first and second substrates; and
a columnar spacer which defines the thickness of the liquid crystal layer,
the liquid crystal display device having a plurality of color display pixels which are arranged in columns and rows to form a matrix pattern,
each of the plurality of color display pixels being defined by a plurality of pixels, which are first, second and third pixels that represent mutually different colors,
wherein the first substrate includes a pixel electrode which is provided for an associated one of the plurality of pixels, a thin-film transistor which is electrically connected to the pixel electrode, and an interlayer insulating layer which covers the thin-film transistor,
the second substrate includes a counter electrode which faces the pixel electrode, first, second and third color filters which transmit light rays in mutually different colors, and an opaque layer,
the thin-film transistor includes a gate electrode, a source electrode, and a drain electrode,
the interlayer insulating layer has a contact hole to connect the pixel electrode electrically to the drain electrode of the thin-film transistor,
the first, second and third color filters are arranged in a delta arrangement,
each of the plurality of pixels has a substantially polygonal shape with n vertices (where n is an integer which is equal to or greater than eight) or a substantially circular shape,
the thin-film transistor and the columnar spacer which are associated with each of the plurality of pixels are arranged in a first tricolor boundary region which is defined between the first, second and third pixels, the contact hole associated with each of the plurality of pixels is arranged in a second tricolor boundary region which is also defined between the first, second and third pixels but which is different from the first tricolor boundary region, and when the first and second tricolor boundary regions are associated with an arbitrary one of the plurality of pixels, two of the first, second and third pixels that define the first tricolor boundary region are the same as two of the first, second and third pixels that define the second tricolor boundary region, and the other of the first, second and third pixels that define the first tricolor boundary region is arranged at a different location from the other of the first, second and third pixels that define the second tricolor boundary region.

2. The liquid crystal display device of claim 1, comprising a liquid crystal capacitor which is formed by the pixel electrode, the counter electrode and the liquid crystal layer and a storage capacitor which is electrically connected in parallel to the liquid crystal capacitor, wherein the storage capacitor is arranged in the second tricolor boundary region.

3. The liquid crystal display device of claim 1, wherein a line which connects together respective approximate centers of the first and second tricolor boundary regions that are associated with the arbitrary one of the plurality of pixels is tilted with respect to row and column directions.

4. The liquid crystal display device of claim 1, wherein the first substrate includes a scan line which runs in the row direction and which is electrically connected to the gate electrode and a signal line which is electrically connected to the source electrode.

5. The liquid crystal display device of claim 4, wherein when viewed along a normal to its display screen, both of the scan line and the signal line overlap at least partially with the pixel electrode.

6. The liquid crystal display device of claim 4, wherein the first substrate includes: a storage capacitor electrode which is electrically connected to the pixel electrode; a storage capacitor counter electrode which faces the storage capacitor electrode; a storage capacitor line which is electrically connected to the storage capacitor counter electrode; and a projection portion which is extended in the column direction from the storage capacitor counter electrode, and a portion of the signal line and the projection portion are arranged in a bicolor boundary region which is defined between the first and second pixels that are adjacent to each other in the row direction, or between the second and third pixels that are adjacent to each other in the row direction, or between the third and first pixels that are adjacent to each other in the row direction.

7. The liquid crystal display device of claim 1, wherein each of the plurality of pixels has a substantially regular octagonal shape.

8. The liquid crystal display device of claim 7, wherein the pixel electrode has a portion in the substantially regular octagonal shape.

9. The liquid crystal display device of claim 7, wherein the opaque layer has holes in the substantially regular octagonal shape which are respectively associated with the plurality of pixels, and each of the first, second and third color filters has a substantially hexagonal shape.

10. The liquid crystal display device of claim 4, wherein each of the plurality of pixels has a substantially perfectly circular shape.

11. The liquid crystal display device of claim 1, wherein a plurality of thin-film transistors are connected to a signal line which is electrically connected to the source electrode, and one of the plurality of thin-film transistors that is connected to the signal line and another one of the thin-film transistors which is adjacent to the one of the plurality of thin-film transistors have structures which are symmetric to each other with respect to an axis that is a line drawn parallel to the column direction.

12. The liquid crystal display device of claim 1, wherein the liquid crystal layer is a vertical alignment liquid crystal layer.

13. The liquid crystal display device of claim 2, wherein the liquid crystal layer is a horizontal alignment liquid crystal layer, the first substrate has an alignment film which is provided to face the liquid crystal layer, the alignment film has been subjected to a rubbing treatment, the alignment film has been rubbed from the second tricolor boundary region toward the respective centers of its associated pixels, and the pixel electrode has a shape in which none of its edges are located in a boundary between the second tricolor boundary region and its associated pixels.

14. The liquid crystal display device of claim 1, comprising a liquid crystal capacitor which is formed by the pixel electrode, the counter electrode and the liquid crystal layer and a storage capacitor which is electrically connected in parallel to the liquid crystal capacitor, wherein the first substrate includes a transparent electrode which overlaps with the pixel electrode with a dielectric layer interposed between them, and the storage capacitor is formed by the pixel electrode, the transparent electrode and the dielectric layer interposed between the pixel electrode and the transparent electrode.

15. The liquid crystal display device of claim 14, wherein the first substrate includes a connection line which is extended from the drain electrode of the thin-film transistor that is arranged in the first tricolor boundary region toward the contact hole that is arranged in the second tricolor boundary region, and the connection line has a portion which runs straight in a direction that is tilted with respect to the row direction.

* * * * *